(12) United States Patent
Matsumoto

(10) Patent No.: US 7,046,600 B2
(45) Date of Patent: May 16, 2006

(54) OPTICAL DISC APPARATUS WITH LASER POWER CONTROL MATCHING LINEAR RECORDING VELOCITY

(75) Inventor: Keishi Matsumoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 658 days.

(21) Appl. No.: 10/208,552

(22) Filed: Jul. 30, 2002

(65) Prior Publication Data

US 2003/0036861 A1 Feb. 20, 2003

(30) Foreign Application Priority Data

Aug. 1, 2001 (JP) ............................ 2001-234116
Sep. 28, 2001 (JP) ............................ 2001-304584

(51) Int. Cl.
*G11B 5/09* (2006.01)
*G11B 7/00* (2006.01)

(52) U.S. Cl. ................. 369/47.53; 369/47.5; 369/53.1; 369/47.37; 369/53.45

(58) Field of Classification Search ...................... None
See application file for complete search history.

(56) References Cited

U.S. PATENT DOCUMENTS

| 5,309,419 A | 5/1994 | Koike |
| 5,732,061 A | 3/1998 | Kirino et al. |
| 6,418,102 B1 | 7/2002 | Suga |

FOREIGN PATENT DOCUMENTS

EP 0825601 A2 8/1997

(Continued)

OTHER PUBLICATIONS

Device and Method for Recording Optical Disk (JP, 5-225,570), Koike Shigeaki, abstract only.

(Continued)

*Primary Examiner*—Muhammad Edun
(74) *Attorney, Agent, or Firm*—Pillsbury Winthrop Sha Pittman LLP

(57) ABSTRACT

A method is designed for controlling a power of a laser beam irradiated onto a track of an optical disc for recording of data at a given linear velocity. The method is carried out by the steps of performing test recording into a predetermined area of the optical disc before actual recording of data, acquiring a reproduction signal representative of a result of the test recording from the predetermined area of the optical disc, acquiring velocity-parameter characteristic information indicative of the relationship between plural levels of the linear velocity and target values of a parameter representative of a quality of the recording, deriving velocity-power characteristic information indicative of the relationship between the levels of the linear velocity and optimal values of the power based on both of the reproduction signal representative of the result of the test recording and the velocity-parameter characteristic information, and controlling the power of the laser beam irradiated onto the optical disc in accordance with the velocity-power characteristic information at the time of the actual recording.

22 Claims, 17 Drawing Sheets

U.S. PATENT DOCUMENTS

| | | |
|---|---|---|
| 6,480,450 B1 | 11/2002 | Fujii et al. |
| 6,556,524 B1 | 4/2003 | Takeshita |
| 6,563,775 B1 | 5/2003 | Sato |
| 6,577,571 B1 | 6/2003 | Takeda et al. |
| 6,711,108 B1 | 3/2004 | Mashimo et al. |
| 6,845,071 B1 | 1/2005 | Shoji et al. |
| 2001/0004344 A1 | 6/2001 | Roh |
| 2002/0003760 A1* | 1/2002 | Honda ..................... 369/47.52 |
| 2002/0105874 A1 | 8/2002 | Matsumoto |
| 2002/0181365 A1* | 12/2002 | Nakajo ..................... 369/47.53 |

FOREIGN PATENT DOCUMENTS

| | | |
|---|---|---|
| EP | 2000-200416 | 7/2000 |
| EP | 1081696 A2 | 8/2000 |
| GB | 2336 463 A | 10/1999 |

OTHER PUBLICATIONS

State Intellectual Property Office of People's Republic of China, The First Office Action, Application No. 02127347.2, Issuing Date: Mar. 11, 2005, Applicant: Yamaha Corporation.

* cited by examiner

| RECORDING LINEAR VELOCITY | OPTIMUM VALUE T$\beta$ OF TARGET $\beta$ VALUE |
|---|---|
| 1-FOLD VELOCITY (STANDARD VELOCITY) TO 2-FOLD VELOCITY | T$\beta$1 |
| 2-FOLD VELOCITY TO 3-FOLD VELOCITY | T$\beta$2 |
| 3-FOLD VELOCITY TO 4-FOLD VELOCITY | T$\beta$3 |
| 4-FOLD VELOCITY TO 5-FOLD VELOCITY | T$\beta$4 |

| ADDRESS VALUE | OPTIMUM VALUE OF TARGET $\beta$ VALUE |
|---|---|
| 1~100 | T$\beta$1 |
| 101~200 | T$\beta$2 |
| 201~300 | T$\beta$3 |
| ... | ... |

FIG.15

| ANGULAR VELOCITY | ADDRESS VALUE | OPTIMUM VALUE OF TARGET $\beta$ VALUE |
|---|---|---|
| 100rpm | 1~100 | $T\beta 11$ |
| | 101~200 | $T\beta 12$ |
| | 201~300 | $T\beta 13$ |
| | ... | ... |
| 200rpm | 1~100 | $T\beta 21$ |
| | 101~200 | $T\beta 22$ |
| | 201~300 | $T\beta 23$ |
| | ... | ... |

FIG.16
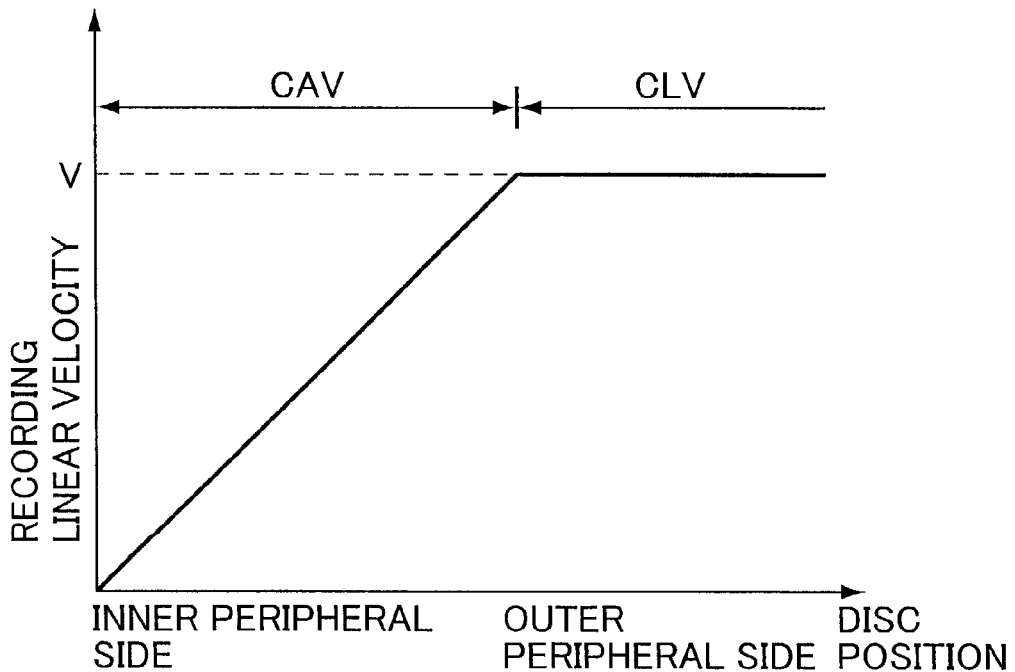
FIG.17
| RECORDING LINEAR VELOCITY | OPTIMUM VALUE $T\beta$ OF TARGET $\beta$ VALUE |
|---|---|
| 12-FOLD VELOCITY | $T\beta 12$ |
| 16-FOLD VELOCITY | $T\beta 16$ |
| 20-FOLD VELOCITY | $T\beta 20$ |
FIG.18
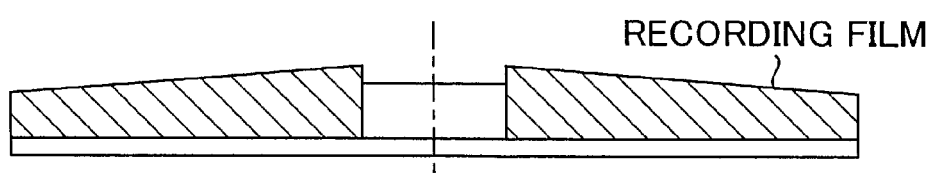

RECORDING FILM

OPTICAL DISC APPARATUS WITH LASER POWER CONTROL MATCHING LINEAR RECORDING VELOCITY

BACKGROUND OF THE INVENTION

1. Technical Field Pertinent to the Invention

The present invention relates to a laser power control method and an optical disc recording apparatus, which is are used for performing data recording on an optical disc such as a CD-R (Compact Disc-Recordable) disc and a CD-RW (Compact Disc-ReWritable) disc, and a structure of a record layer of the optical disc.

2. Prior Art

There are provided various kinds of optical disc recording apparatuses used for performing data recording on an optical disc such as a CD-R and a CD-RW. As a data recording mode, there are a CAV (Constant Angular Velocity) mode which performs driving of the disc with fixing a number of revolutions of the disc (namely, fixing the angular velocity) and a CLV (Constant Linear Velocity) mode which carries out driving of the disc with fixing a linear velocity of a track formed on the disc.

Of these modes, the CAV mode has been widely adopted for performing recording at a higher velocity since a number of revolutions of the disc is fixed, and there is no need to effect the complicated rotation drive control. In the CAV mode, however, a number of revolutions of the disc is fixed and, on the other hand, a trace length by a laser spot (which is proportional to the recording linear velocity) varies depending on a radial position of the spot on the disc. For example, when a recording linear velocity at the innermost periphery of the disc is set to a quadruple velocity of a standard velocity, a recording linear velocity at the outermost periphery of the disc reaches a decuple velocity of the standard velocity. Further, when the recording linear velocity at the innermost periphery of the disc is set to an octuple velocity, it reaches a twentyfold velocity on the outermost periphery of the disc.

As described above, in the optical disc recording apparatus adopting the CAV mode, the recording linear velocity increases as a radial recording position moves from the inner peripheral side toward the outer peripheral side. In diagram of this, the recording laser power is controlled to change in accordance with a radial recording position such that deterioration of a recording quality caused by the variation in the recording linear velocity is suppressed in the conventional optical disc recording apparatus adopting the CAV mode.

However, even if the recording power value is changed in accordance with the recording position, i.e., in matching with the recording linear velocity, there still occurs a problem of lowering of the recording quality. Furthermore, with the recent speeding up of recording, a difference in the recording linear velocity between the innermost peripheral position and the outermost peripheral position increases in the CAV mode, and the above-described deterioration of the recording quality may possibly become more prominent.

SUMMARY OF THE INVENTION

In diagram of the above-described problems, it is an object of the present invention to provide a laser power control method which can perform recording with a higher grade at variable levels of the recording linear velocity in an optical disc recording apparatus capable of performing data recording at the plural levels of the recording linear velocity.

In order to solve the above-mentioned drawbacks, according to the present invention, there is provided a method of controlling a power of a laser beam irradiated onto a track of an optical disc for recording of data at a given linear velocity. The inventive method is carried out by a test recording step of performing test recording into a predetermined area of the optical disc before actual recording of data, a reproduction step of acquiring a reproduction signal representative of a result of the test recording from the predetermined area of the optical disc where the test recording has been carried out, a parameter characteristic acquisition step of acquiring velocity-parameter characteristic information indicative of the relationship between plural levels of the linear velocity and target values of a parameter representative of a quality of the recording in correspondence with the respective levels of the linear velocity, a derivation step of deriving velocity-power characteristic information indicative of the relationship between the levels of the linear velocity and optimal values of the power based on both of the reproduction signal representative of the result of the test recording and the velocity-parameter characteristic information, and a control step of controlling the power of the laser beam irradiated onto the optical disc in accordance with the velocity-power characteristic information at the time of the actual recording.

Preferably, the parameter characteristic acquisition step is carried out to derive the velocity-parameter characteristic information from the reproduction signal acquired by the reproduction step. Alternatively, the parameter characteristic acquisition step acquires the velocity-parameter characteristic information which has been stored in advance.

Preferably, the test recording step is performed at each level of the linear velocity while changing the power of the laser beam, and the derivation step determines an optimal value of the power at which the target value of the parameter is obtained for each level of the linear velocity according to both of the velocity-parameter characteristic information and the reproduction signal representative of the result of the test recording to thereby obtain the relationship between each level of the linear velocity and the corresponding optimal value of the power.

Preferably, the control step comprises detecting a value of the power of the laser beam irradiated onto the optical disc, controlling the power of the laser beam according to the velocity-power characteristic information in such a manner that the detected value of the power follows the optimal value of the power at a given response speed, and regulating the response speed in accordance with the level of the linear velocity during the actual recording.

In this method, test recording is carried out before actual recording, and the relationship with an optimal laser power value corresponding to each of the plurality of the recording linear velocities is obtained by using the relationship between a reproduction signal of this test recording, the plurality of the recording linear velocities and the parameter associated to the target recording quality at each recording linear velocity. That is, the relationship between the plurality of the recording linear velocities and the optimal laser power corresponding to these velocities can be derived by utilizing the parameters concerning the target recording quality corresponding to the plurality of the recording linear velocities. Therefore, even if recording in which a recording linear velocity varies is performed as with, e.g., CAV recording, the appropriate correspondence relationship between the recording linear velocities and the laser power value can be derived with variation in velocity taken into consideration.

As a result, recording with the higher grade can be stably performed even if the recording linear velocity varies.

Moreover, according to another aspect of the present invention, there is provided a method of controlling a power of a laser beam irradiated onto a track of an optical disc for recording of data at a given linear velocity under either of CAV mode and CLV mode, the CAV mode being selected for rotating the optical disc at a fixed angular velocity in case of the recording at a linear velocity lower than a designated linear velocity and the CLV mode being selected for varying the angular velocity of the optical disc in such a manner that the recording is executed at the designated linear velocity after the linear velocity reaches the designated linear velocity. The inventive method is carried out by a test recording step of performing test recording into a predetermined area of the optical disc before actual recording of data, a reproduction step of acquiring a reproduction signal representative of a result of the test recording from the predetermined area of the optical disc where the test recording has been carried out, a parameter acquisition step of acquiring a target value of a parameter representative a quality of the recording at the designated linear velocity, a derivation step of deriving velocity-power characteristic information indicative of the relationship between the designated linear velocity and an optimal value of the power of the laser beam based on both of the reproduction signal representative of the result of the test recording and the target value of the parameter representative the quality of the recording at the designated linear velocity, and a control step of controlling the power of the laser beam irradiated onto the optical disc in accordance with the velocity-power characteristic information at the time of the actual recording.

Preferably, the control step comprises detecting a value of the power of the laser beam irradiated onto the optical disc, controlling the power of the laser beam according to the velocity-power characteristic information in such a manner that the detected value of the power follows the optimal value of the power at a given response speed, and regulating the response speed in accordance with the designated linear velocity.

In this method, when performing recording in a so-called partial CAV mode, the correspondence relationship between the recording linear velocity and the optimal laser power is derived before actual recording by using a parameter associated to a recording quality corresponding to the designated recording linear velocity of the CLV mode which is equivalent to a maximum recording linear velocity of the CAV mode. In case of recording in the partial CAV mode, therefore, an optimal laser power value can be derived at the maximum recording linear velocity specified by a user. Thus, at the time of high-velocity recording, the laser power control must be accurate, thereby stably effecting recording with the higher grade.

In addition, according to still another aspect of the present invention, there is provided a method of controlling a power of a laser beam irradiated onto a track of an optical disc for recording of data along the track at a given linear velocity. The inventive method is carried out by a return light detection step of detecting a value associated to a return light reflected back from the optical disc upon irradiation of the laser beam during the recording, a linear velocity acquisition step of acquiring a value of the linear velocity during the recording of data onto the optical disc, and a control step of controlling the power of the laser beam to be irradiated onto the optical disc based on both of the detected value associated to the return light and the acquired value of the linear velocity.

Preferably, the control step controls the power of the laser beam to be irradiated onto the optical disc in such a manner that the detected value associated to the return light and the acquired value of the linear velocity satisfy a correlation therebetween which is provisionally prepared. In such a case, the correlation between the value of the linear velocity and the value associated to the return light is derived based on a result of recording carried out at different values of the linear velocity in advance.

Preferably, the control step controls the power of the laser beam to be irradiated onto the optical disc in such a manner that the detected value associated to the return light and the acquired value of the linear velocity satisfy a correlation among the value of the linear velocity, the value associated to the return light and the value of the power of the laser beam, which are prepared in advance.

Preferably, the inventive method further comprises a test recording step of performing test recording onto the optical disc before actual recording, and an initial value determination step of determining an initial value of the power of the laser beam from a result of the test recording, wherein the control step sets the power of the laser beam to the initial value when starting the actual recording and controls the power of the laser beam to be irradiated onto the optical disc based on the detected value associated to the return light and the acquired value of the linear velocity after the start of the actual recording. In such a case, the inventive method further comprises a start velocity acquisition step of acquiring a start value of the linear velocity, which is used when starting the actual recording, wherein the test recording step performs the test recording at the start value of the linear velocity acquired by the start velocity acquisition step.

In this method, a value associated to return light from the optical disc is detected in the actual recording, and the laser power is controlled based on both of the value associated to return light and the recording linear velocity at that moment. That is, the laser power control can be carried out, which reflects the state of the actual recording. Additionally, in this method, the recording linear velocity is acquired and the acquired recording linear velocity is used for determining a laser power value, hence the laser power control can be performed even if the recording velocity varies as in CAV recording or the like.

Further, according to yet another aspect of the present invention, there is provided a method of controlling a power of a laser beam irradiated onto a track of an optical disc for recording of data at a given linear velocity under either of CAV mode and CLV mode, the CAV mode being selected for rotating the optical disc at a fixed angular velocity in case of the recording at a linear velocity lower than a designated linear velocity and the CLV mode being selected for varying the angular velocity of the optical disc in such a manner that the recording is executed at the designated linear velocity after the linear velocity reaches the designated linear velocity. The inventive method is carried out by a detection step of detecting a value associated to a return light reflected back from the optical disc upon irradiation of the laser beam during the recording, an acquisition step of acquiring a correspondence relationship between different values of the linear velocity and respective target values associated to the return light determined for the different values of the linear velocity, a target value acquisition step of acquiring a target value associated to the return light corresponding to the designated linear velocity with reference to the acquired correspondence relationship, and a control step of controlling the power of the laser beam irradiated onto the optical disc in such a manner that the value associated to the return light detected by the detection step coincides with the acquired target value associated to the return light.

In this method, in case of performing recording in a so-called partial CAV mode, a target value of the return light corresponding to the designated recording linear velocity of the CLV mode which is identical to the maximum recording linear velocity of the CAV mode is set at the time of actual recording, and the laser power is controlled in such a manner that the value associated to the return light from the optical disc obtained in the actual recording coincides with the set target value. When recording in the partial CAV mode, therefore, the optimal laser power control matching with the maximum recording linear velocity specified by a user or the like can be effected, thereby stably performing recording with the higher grade of data recording.

Furthermore, according to the present invention, there is provided an apparatus for irradiating a laser beam having a controllable power onto a track of an optical disc to effect recording of data along the track at a given linear velocity. The inventive apparatus comprises a test recording section that is provided for performing test recording into a predetermined area of the optical disc before actual recording of data, a reproduction section that is provided for acquiring a reproduction signal representative of a result of the test recording from the predetermined area of the optical disc where the test recording has been carried out, a parameter characteristic acquisition section that is provided for acquiring velocity-parameter characteristic information indicative of the relationship between plural levels of the linear velocity and target values of a parameter representative of a quality of the recording in correspondence with the respective levels of the linear velocity, a derivation section that is provided for deriving velocity-power characteristic information indicative of the relationship between the levels of the linear velocity and optimal values of the power of the laser beam based on both of the reproduction signal representative of the result of the test recording and the velocity-parameter characteristic information, and a control section that is provided for controlling the power of the laser beam irradiated onto the optical disc in accordance with the velocity-power characteristic information at the time of the actual recording.

Further, according to a further aspect of the present invention, there is provided an apparatus for irradiating a laser beam having a controllable power onto a track of an optical disc to effect recording of data along the track at a given linear velocity under either of CAV mode and CLV mode, the CAV mode being selected for rotating the optical disc at a fixed angular velocity in case of the recording at a linear velocity lower than a designated linear velocity and the CLV mode being selected for varying the angular velocity of the optical disc in such a manner that the recording is executed at the designated linear velocity after the linear velocity reaches the designated linear velocity. The inventive apparatus comprises a test recording section that is provided for performing test recording into a predetermined area of the optical disc before actual recording of data, a reproduction section that is provided for acquiring a reproduction signal representative of a result of the test recording from the predetermined area of the optical disc where the test recording has been carried out, a parameter acquisition section that is provided for acquiring a target value of a parameter representative a quality of the recording at the designated linear velocity, a derivation section that is provided for deriving velocity-power characteristic information indicative of the relationship between the designated linear velocity and an optimal value of the power of the laser beam based on both of the reproduction signal representative of the result of the test recording and the target value of the parameter representative the quality of the recording at the designated linear velocity, and a control section that is provided for controlling the power of the laser beam irradiated onto the optical disc in accordance with the velocity-power characteristic information at the time of the actual recording.

Furthermore, according to a yet further aspect of the present invention, there is provided an apparatus for irradiating a laser beam having a controllable power onto a track of an optical disc to effect recording of data along the track at a given linear velocity. The inventive apparatus comprises a return light detection section that is provided for detecting a value associated to a return light reflected back from the optical disc upon irradiation of the laser beam during the recording, a linear velocity acquisition section that is provided for acquiring a value of the linear velocity during the recording of data on the optical disc, and a control section that is provided for controlling the power of the laser beam to be irradiated onto the optical disc based on both of the detected value associated to the return light and the acquired value of the linear velocity.

Moreover, according to a still further aspect of the present invention, there is provided an apparatus for irradiating a laser beam having a controllable power onto a track of an optical disc to effect recording of data along the track at a given linear velocity under either of CAV mode and CLV mode, the CAV mode being selected for rotating the optical disc at a fixed angular velocity in case of the recording at a linear velocity lower than a designated linear velocity and the CLV mode being selected for varying the angular velocity of the optical disc in such a manner that the recording is executed at the designated linear velocity after the linear velocity reaches the designated linear velocity. The inventive apparatus comprises a detection section that is provided for detecting a value associated to a return light reflected back from the optical disc upon irradiation of the laser beam during the recording, an acquisition section that is provided for acquiring a correspondence relationship between different values of the linear velocity and respective target values associated to the return light determined for the different values of the linear velocity, a target value acquisition section that is provided for acquiring a target value associated to the return light corresponding to the designated linear velocity with reference to the acquired correspondence relationship, and a control section that is provided for controlling the power of the laser beam irradiated on the optical disc in such a manner that the value associated to the return light detected by the detection step coincides with the acquired target value associated to the return light.

In addition, according to the present invention, there is provided an optical disc having a circular shape for recording information on a record plane by scanning a laser beam along a radial direction of the circular shape while rotating the record plane, The inventive optical disc comprises a substrate having the circular shape, and a pigment film formed on the substrate to define the record plane, the pigment film having a thickness which is set smaller on a radially outer peripheral side of the circular shape than that on a radially inner peripheral side of the circular shape.

According to this structure, the disc is suitable in case of performing the data recording in the CAV mode such that a recording linear velocity at a position on the outer peripheral side of the optical disc is higher than that at a position on the inner peripheral side. Since the pigment film is formed with a thickness variation in taking consideration of the linear velocity variation, deterioration in the recording quality can be suppressed even if the laser power control is simplified on the recording apparatus side.

BRIEF DESCRIPTION OF THE DRAWINGS

[Brief Description of the Drawings]

Figure 1:
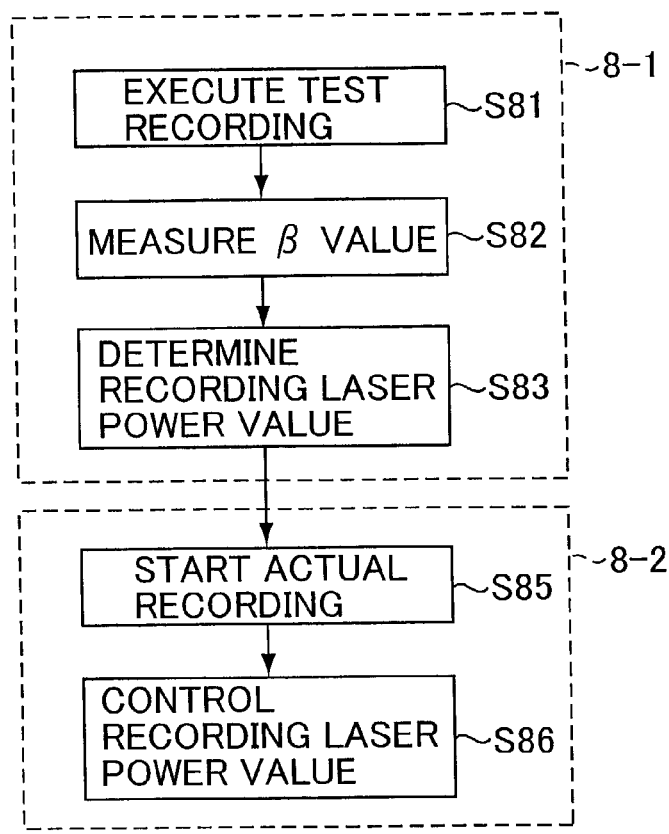

FIG. 1 is a diagram illustrating control of recording laser power in a conventional optical disc recording apparatus.

Figure 2:
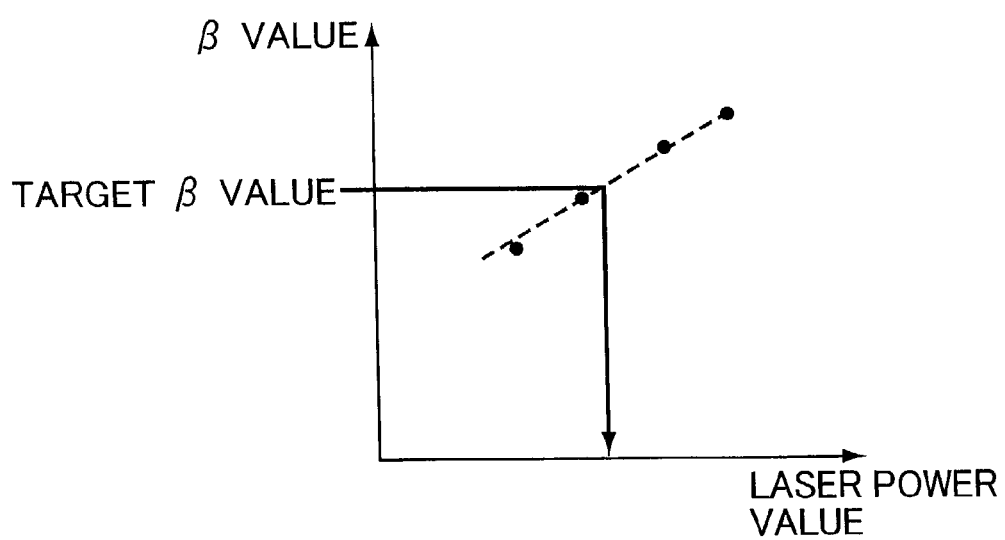

FIG. 2 is a diagram illustrating the control of recording laser power in the conventional optical disc recording apparatus.

Figure 3:
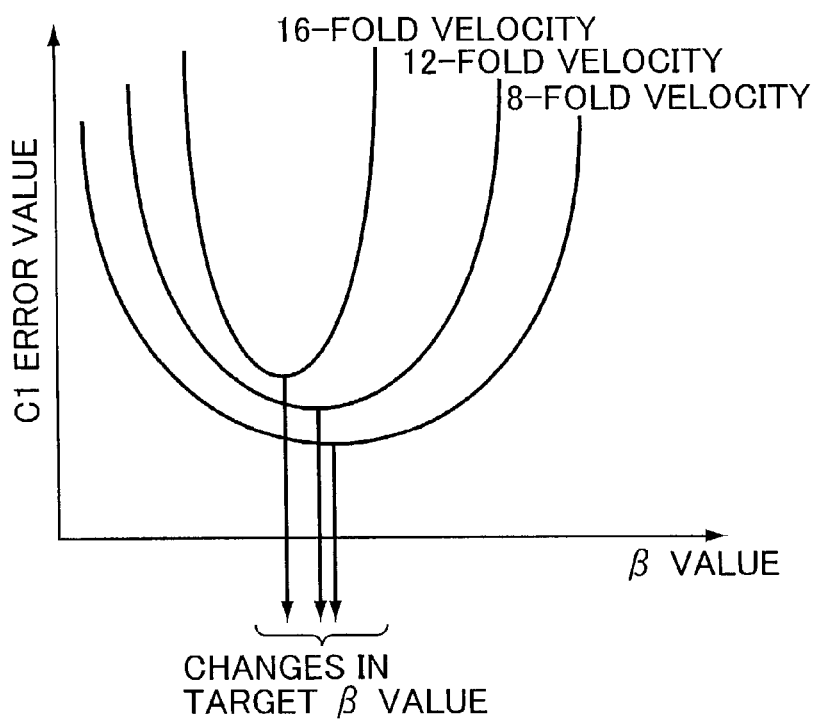

FIG. 3 is a diagram illustrating a result of an experiment conducted by the inventors.

Figure 4:
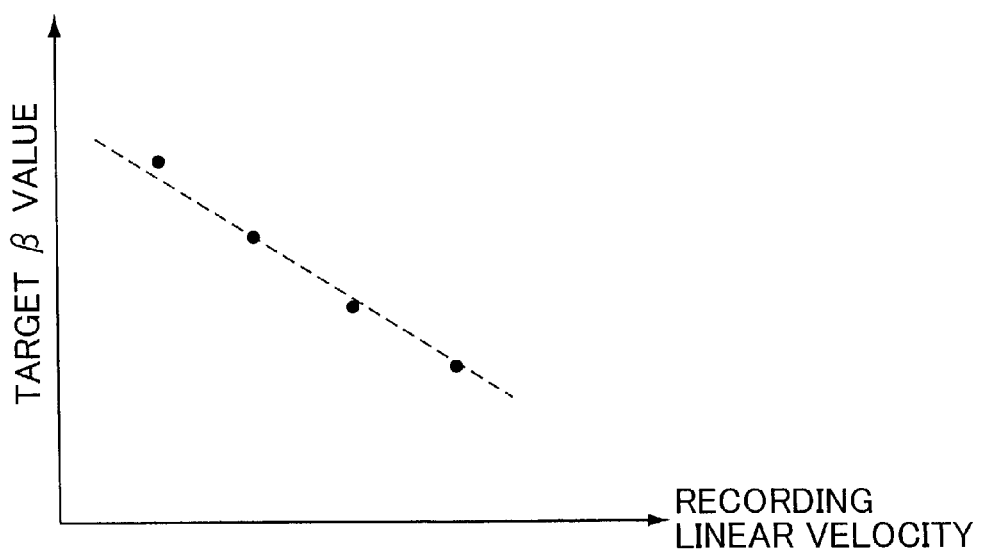

FIG. 4 is a diagram illustrating a result of the experiment conducted by the inventors.

Figure 5:
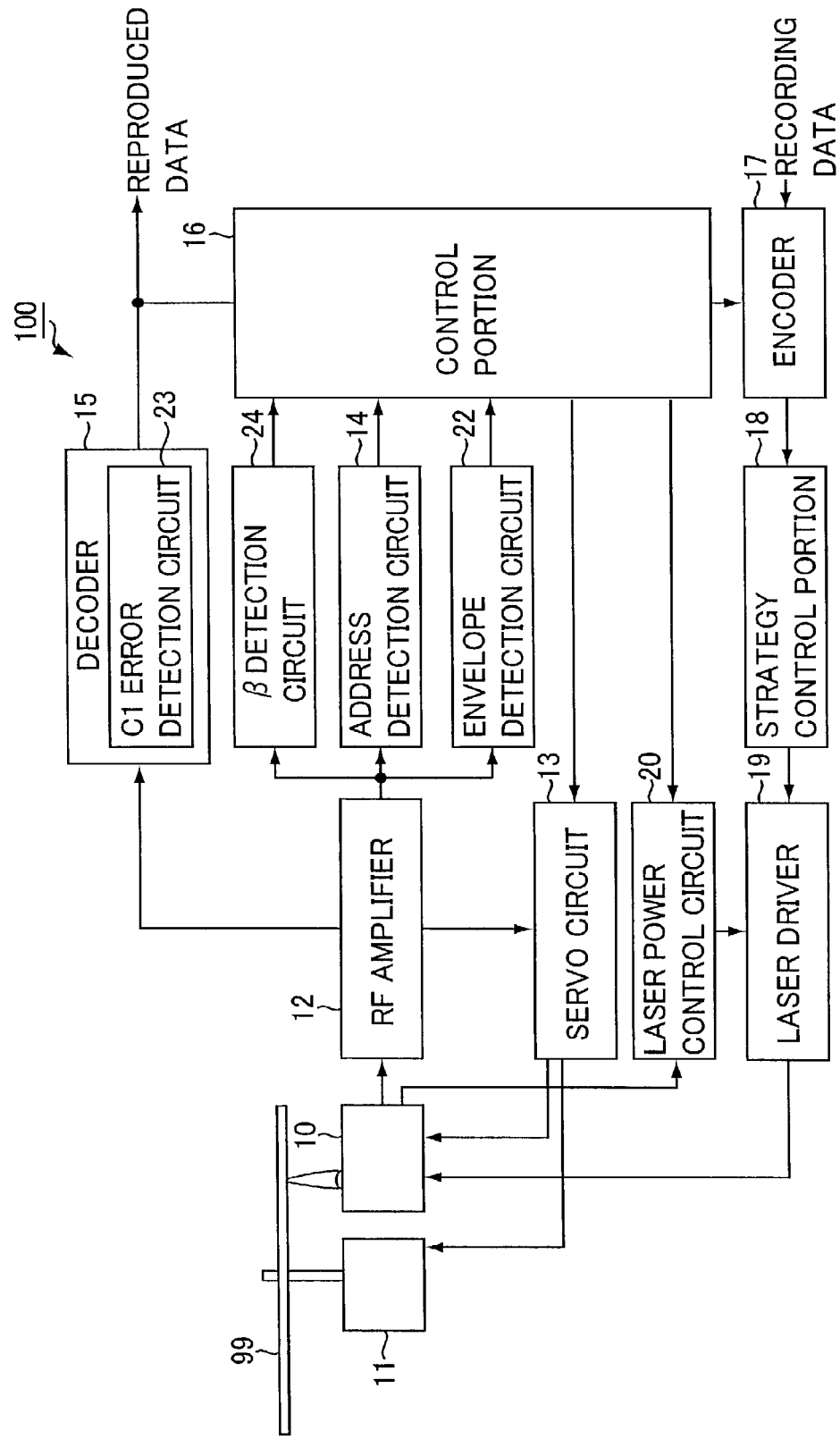

FIG. 5 is a block diagram of an optical disc recording apparatus according to a first embodiment.

Figures 6, 7:
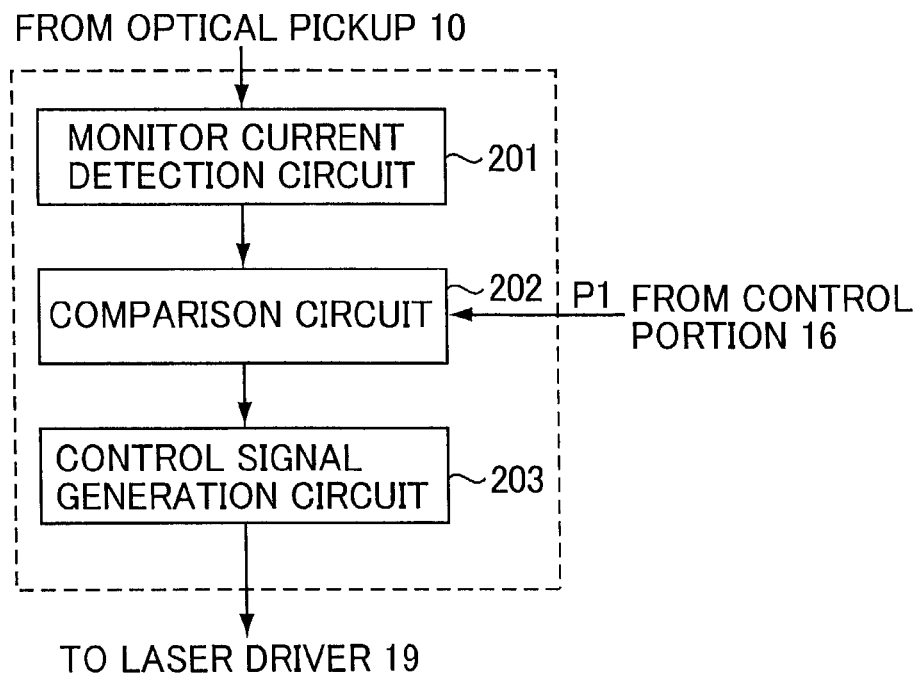

FIG. 6 is a table diagram typically showing a target value table created by a control portion of the optical disc recording apparatus.

FIG. 7 is a block diagram of a laser power control circuit of the optical disc recording apparatus.

Figure 8:
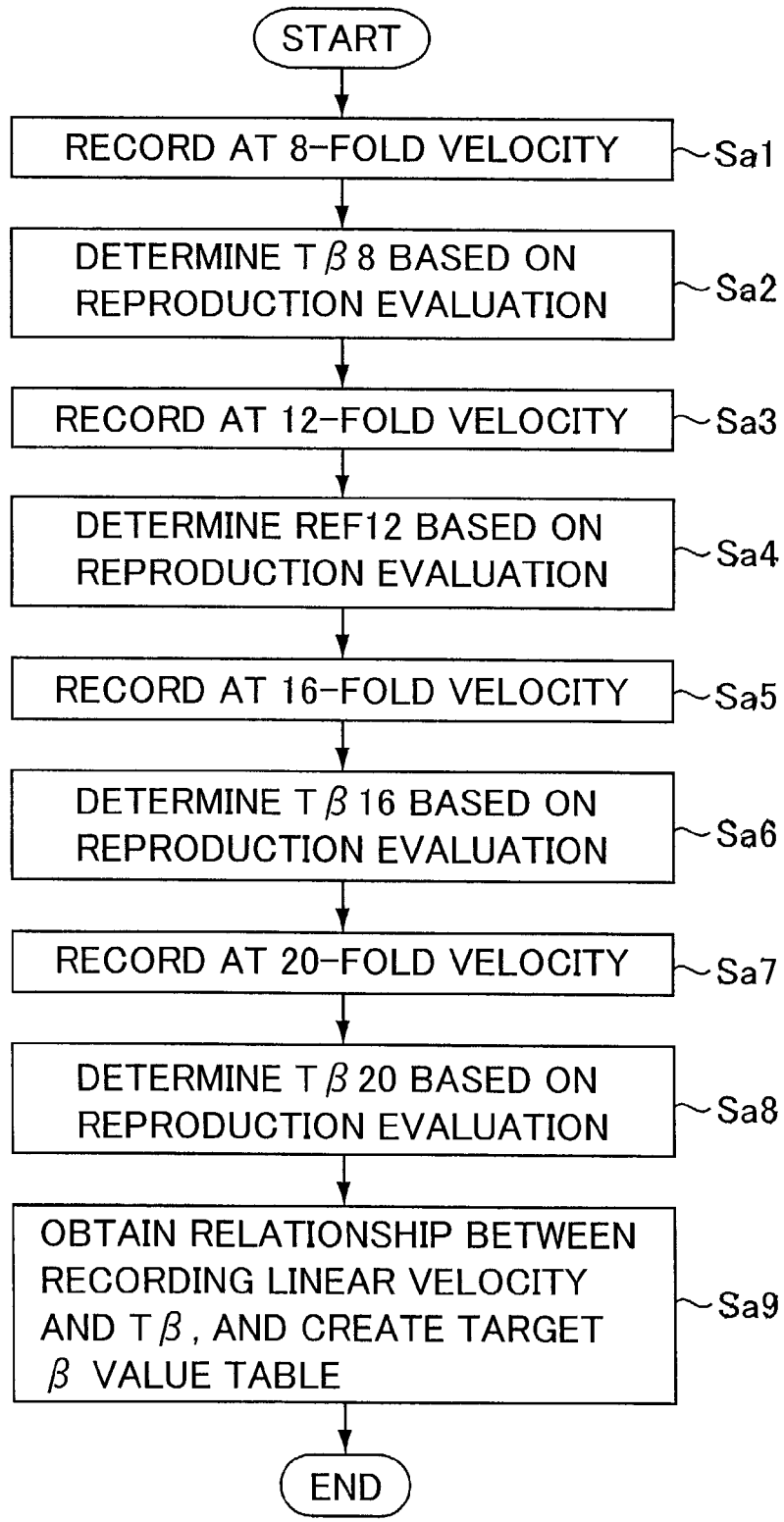

FIG. 8 is a flowchart showing the control process when the control portion of the optical disc recording apparatus creates the target β value table.

Figure 9:
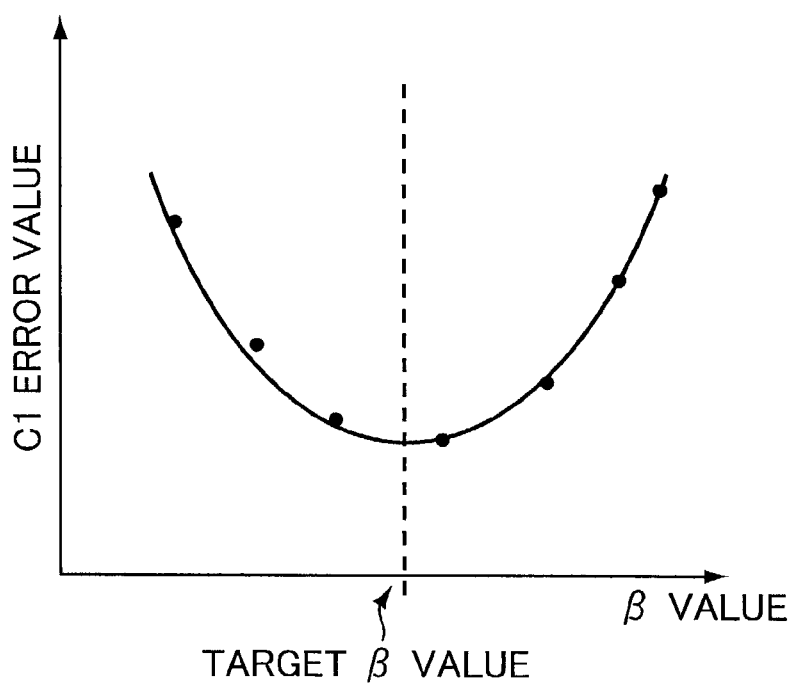

FIG. 9 is a diagram showing an example of the relationship between β values and C1 error values obtained by test recording performed by the optical disc recording apparatus.

Figure 10:
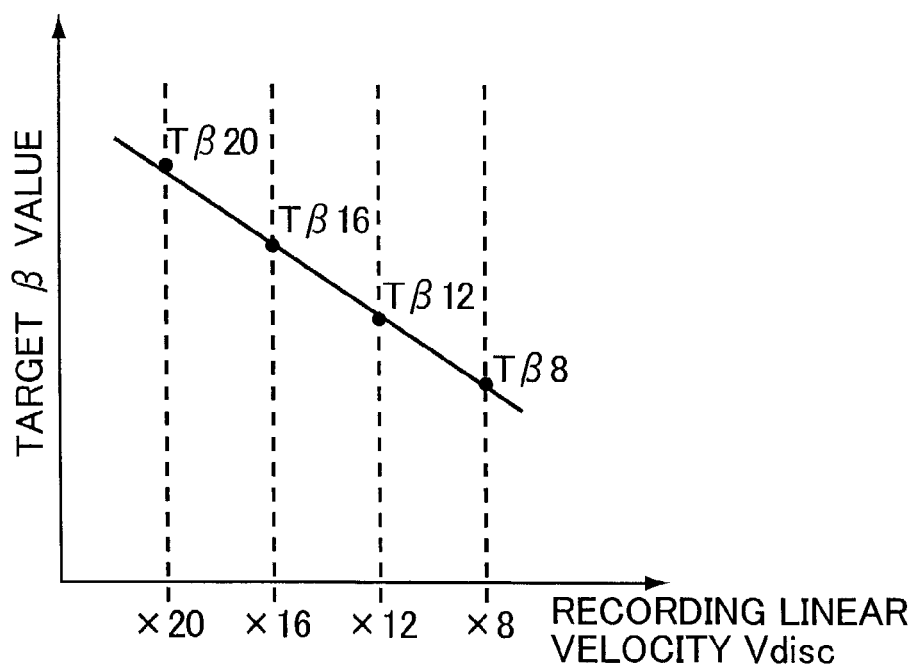

FIG. 10 is a diagram showing an example of the relationship between recording linear velocities and target β values obtained by test recording carried out by the optical disc recording apparatus.

Figure 11:
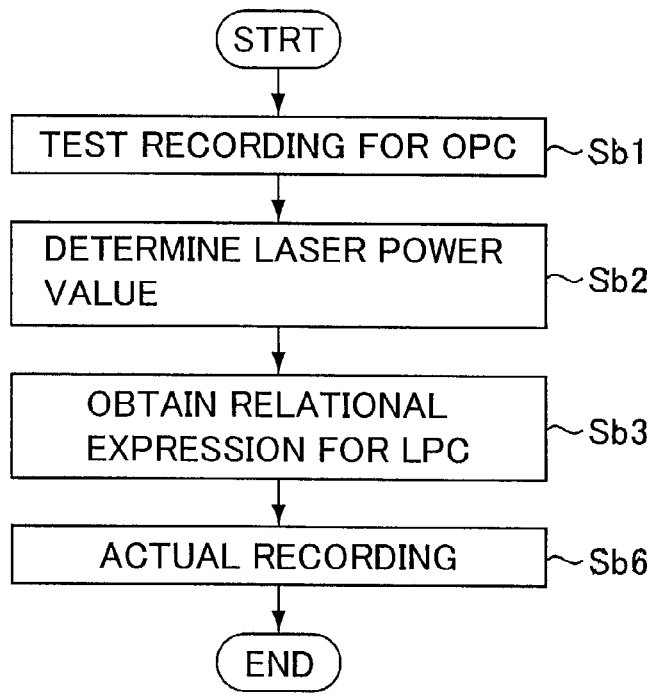

FIG. 11 is a flowchart showing the control process in data recording by the control portion of the optical disc recording apparatus.

Figure 12:
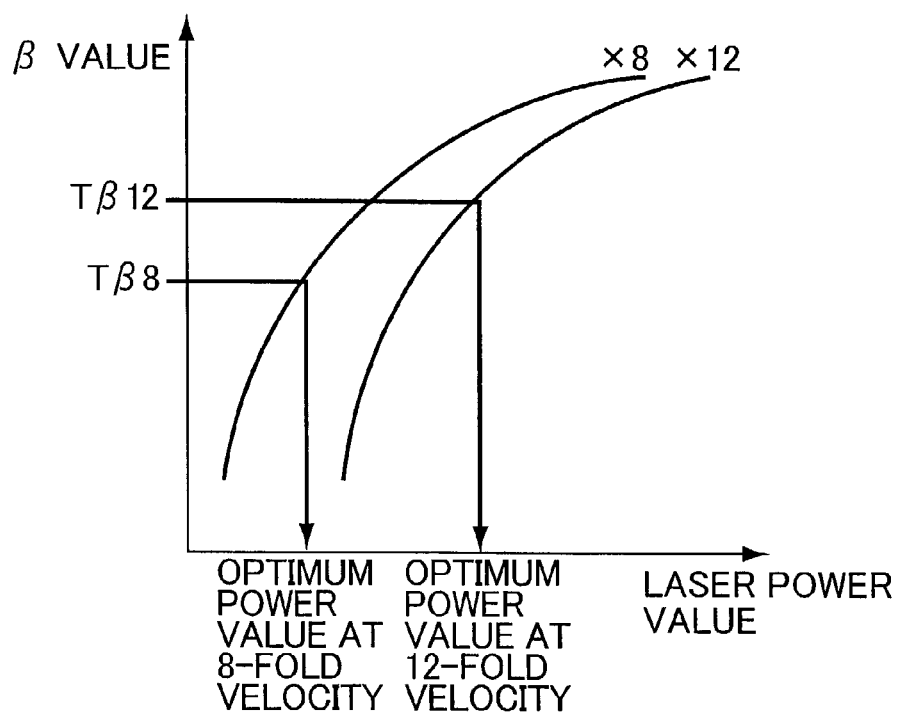

FIG. 12 is a diagram showing an example of the relationship between recording laser power values and β values obtained by OPC.

Figures 13, 14:
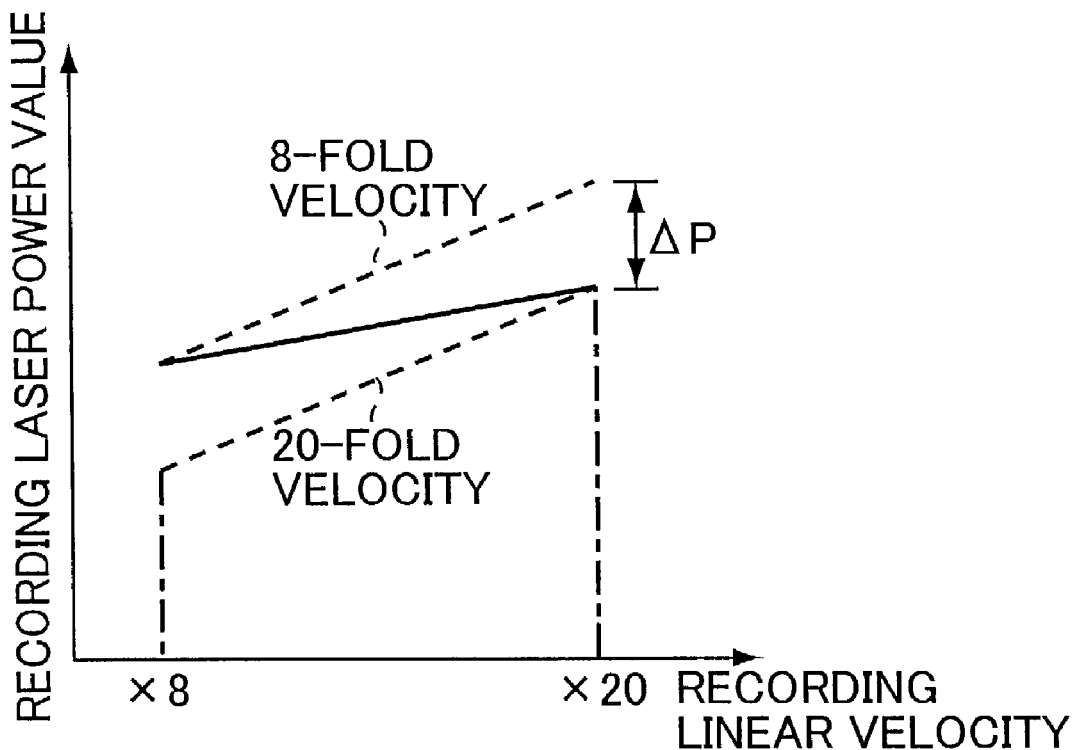

FIG. 13 is a diagram showing an example of the relationship between recording linear velocities and recording laser power values obtained by OPC.

FIG. 14 is a table diagram typically showing the content of a target β value table stored in the optical disc recording apparatus according to a third modification of the present invention.

FIG. 15 is a table diagram typically showing the content of the target β value table stored in the optical disc recording apparatus according to the third modification of the present invention.

FIG. 16 is a graph showing the relationship between radial recording positions on the optical disc and recording linear velocities in recording by the optical disc recording apparatus according to the third modification of the present invention.

FIG. 17 is a table diagram typically showing the content of the target β value table stored in the optical disc recording apparatus according to the third modification.

FIG. 18 is a diagram typically showing a side section of the optical disc according to a second embodiment of the present invention.

Figure 19:
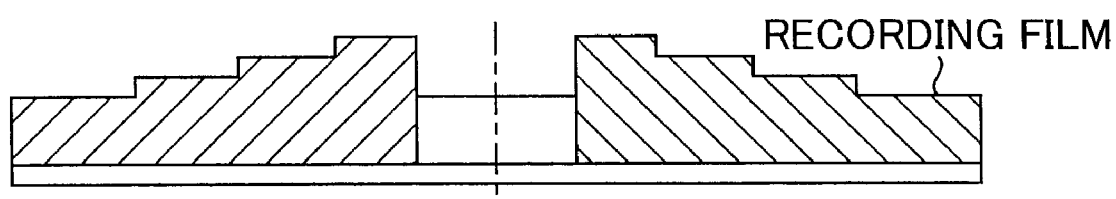

FIG. 19 is a diagram typically showing a side section of the optical disc according to the second embodiment of the present invention.

Figure 20:
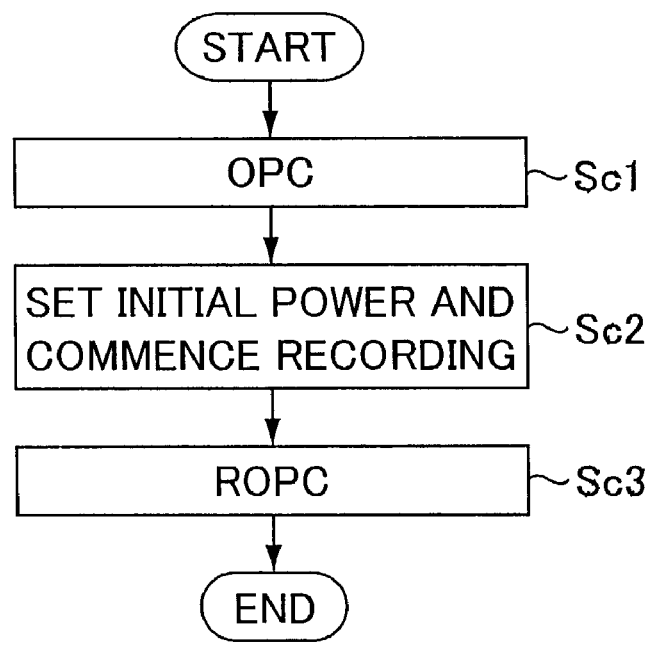

FIG. 20 is a flowchart for illustrating the procedure of a laser power control method according to a third embodiment of the present invention.

Figure 21:
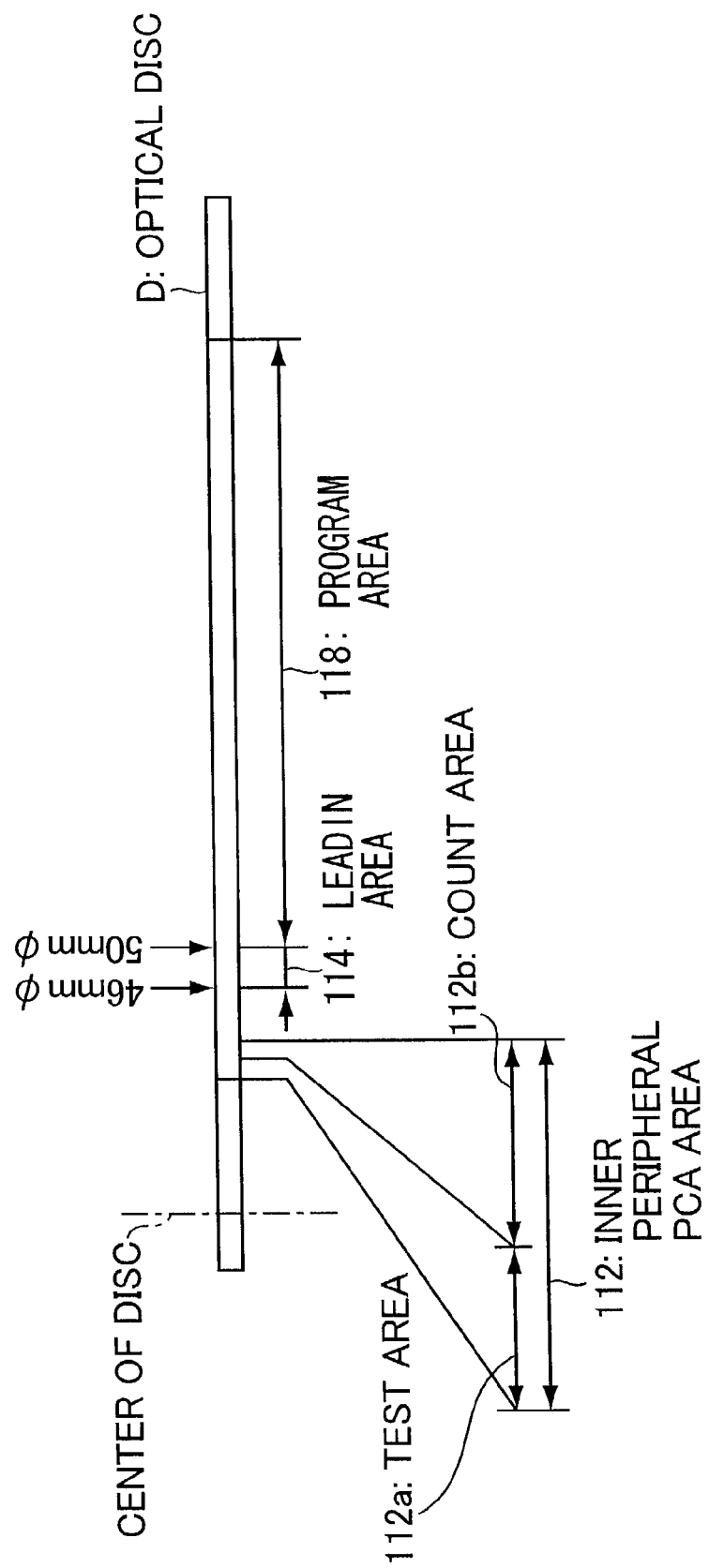

FIG. 21 is a diagram illustrating an area structure of the optical disc in which recording is performed by the laser power control method according to the third embodiment.

Figure 22:
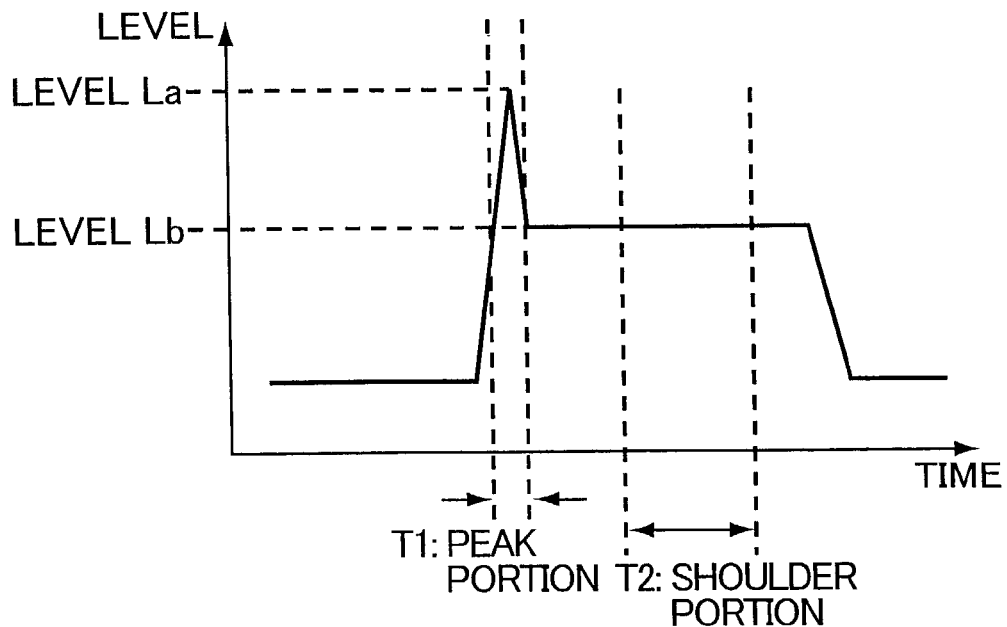

FIG. 22 is a diagram showing an example of return light detected by an RF amplifier used in the laser power control method according to the third embodiment.

Figure 23:
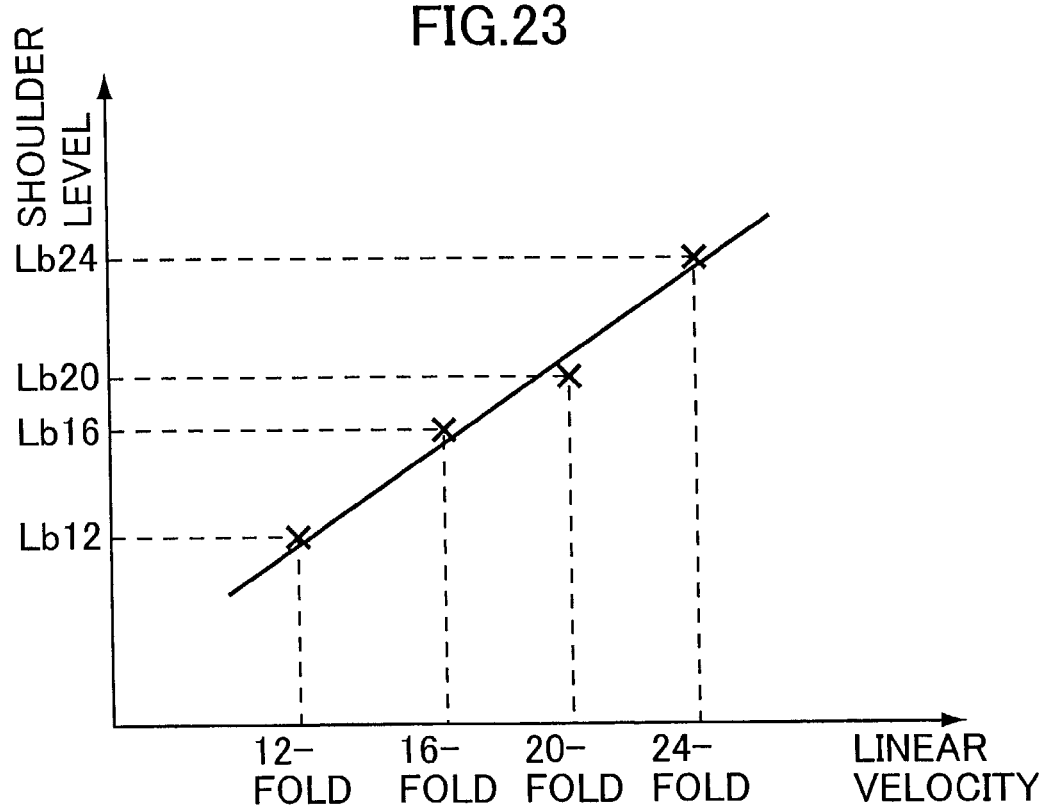

FIG. 23 is a graph showing the correlation between shoulder levels of the return light and recording linear velocities used in the laser power control method according to the third embodiment.

Figure 24:
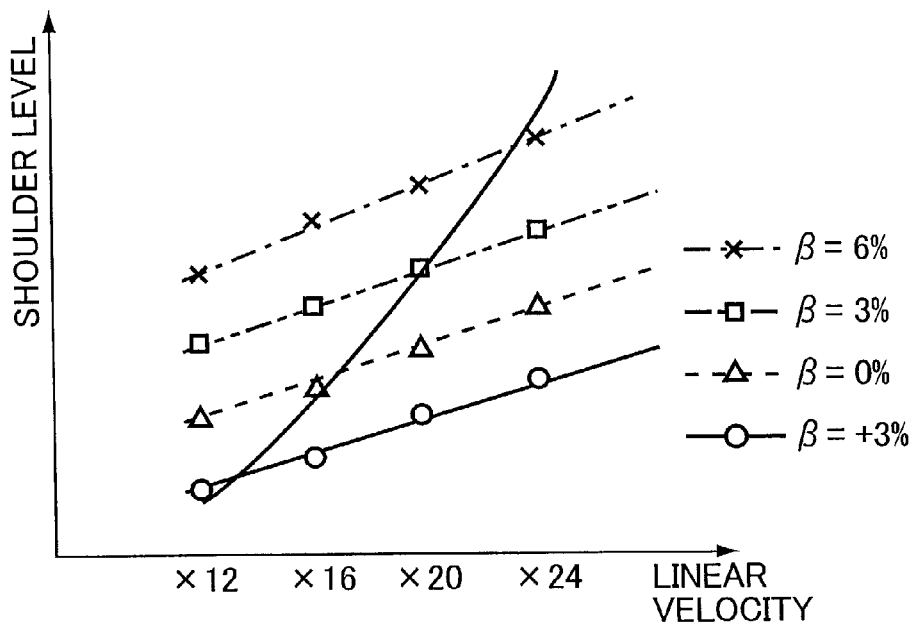

FIG. 24 is a graph showing another example of the correlation between the shoulder levels of the return light and the recording linear velocities used in the laser power control method according to the third embodiment.

Figure 25:
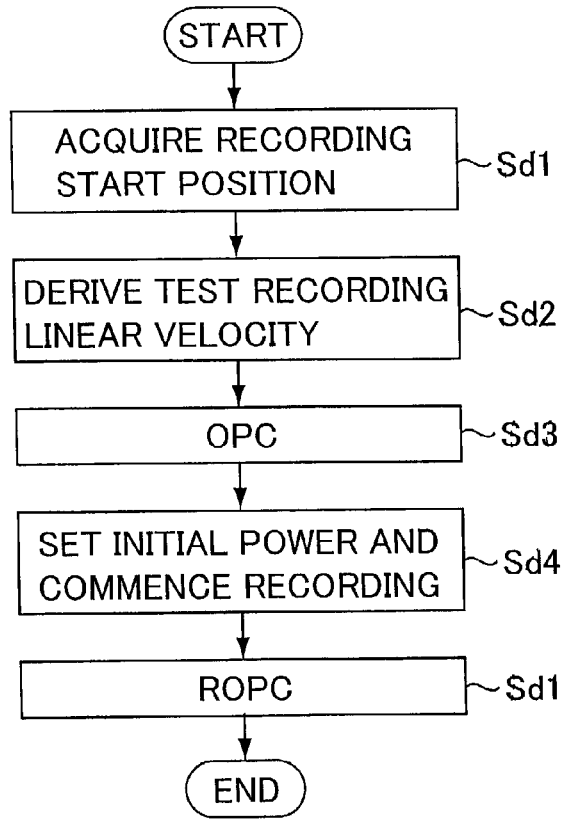

FIG. 25 is a flowchart for illustrating the procedure of a modification of the laser power control method according to the third embodiment.

Figure 26:
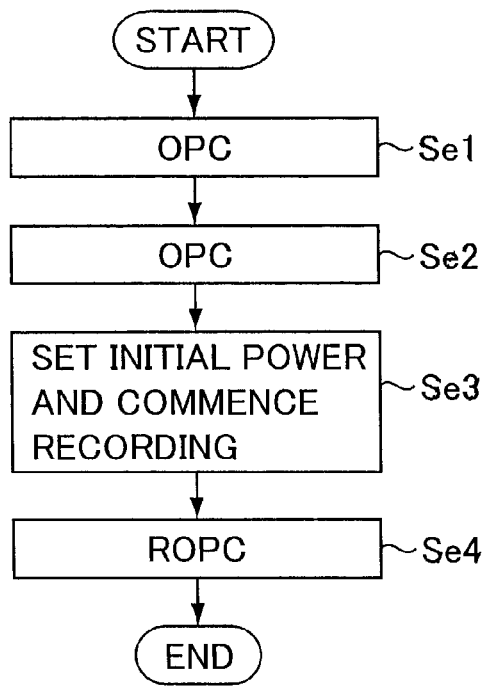

FIG. 26 is a flowchart for illustrating the procedure of another modification of the laser power control method according to the third embodiment.

Figure 27:
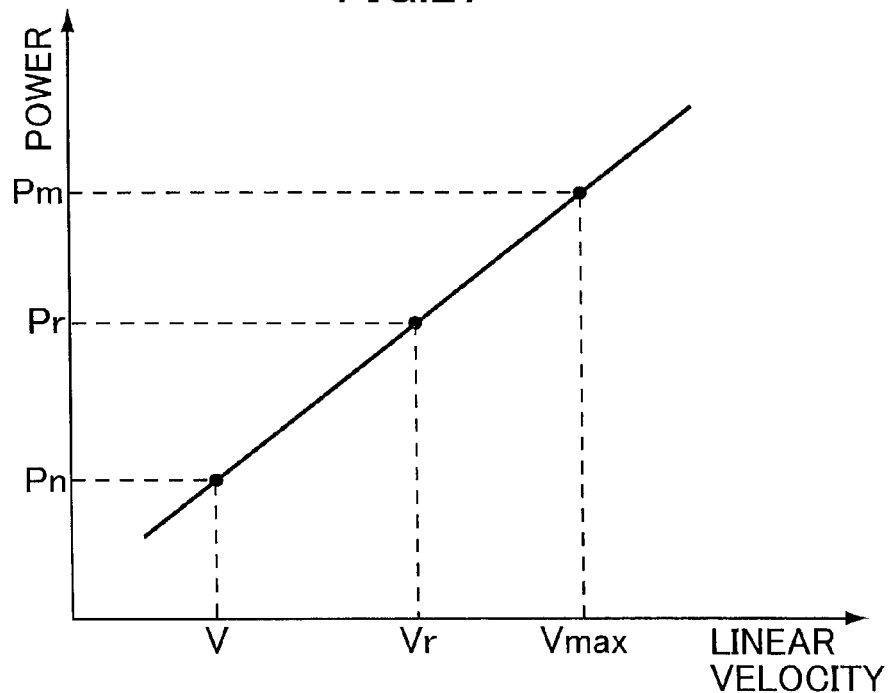

FIG. 27 is a graph showing the correlation between recording linear velocities and optimum power values used in still another modification of the laser power control method according to the third embodiment.

Figure 28:
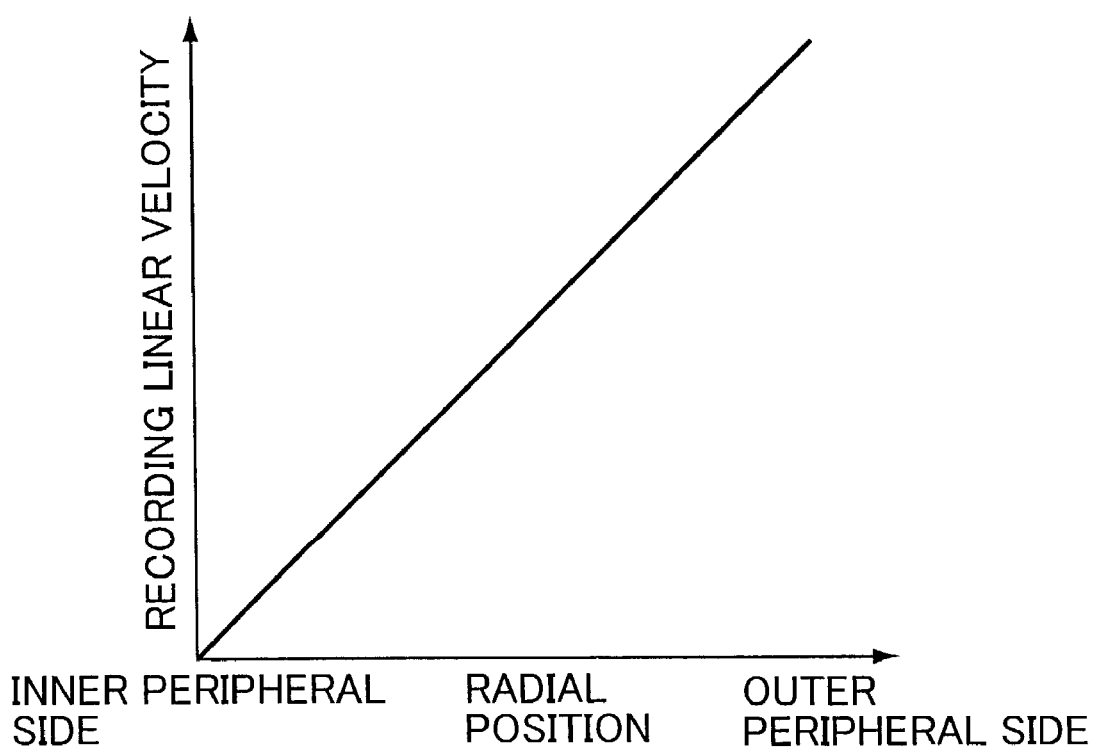

FIG. 28 is a graph showing the relationship between radial recording positions and recording linear velocities in CAV recording.

Figures 29, 30:
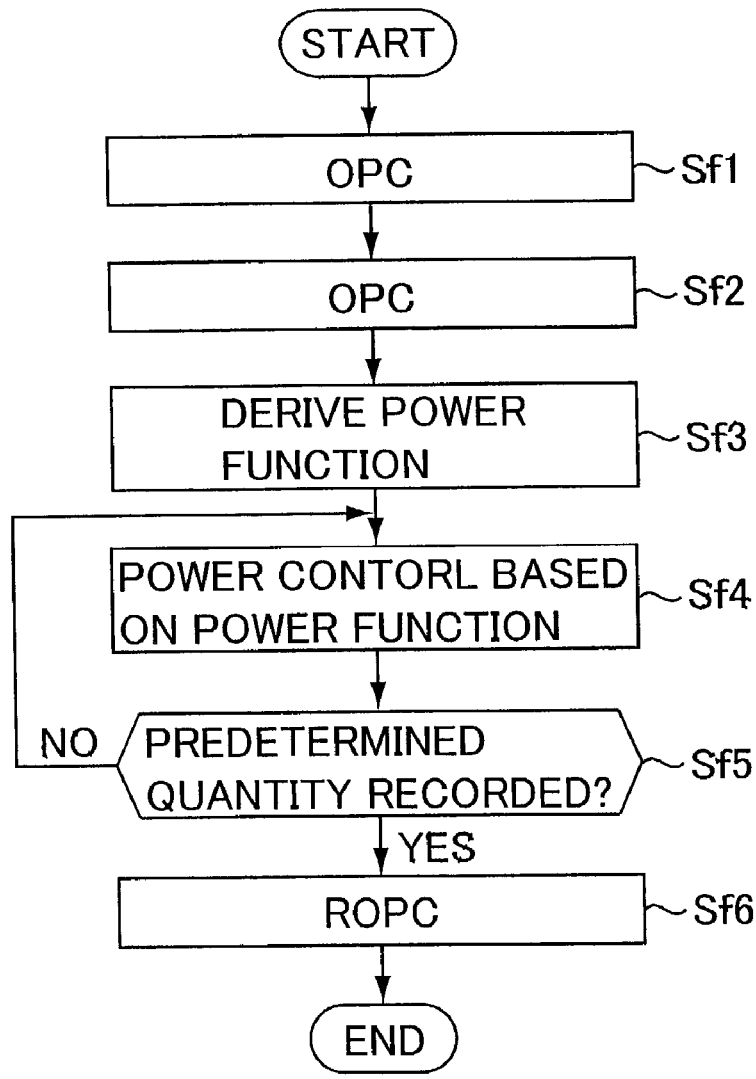

FIG. 29 is a flowchart for illustrating the procedure of still another modification of the laser power control method according to the third embodiment.

FIG. 30 is a table diagram illustrating the content of a table used in a further embodiment of the laser power control method according to the third embodiment.

DETAILED DESCRIPTION OF THE INVENTION

Embodiments according to the present invention will now be described hereinafter with reference to the accompanying drawings.

A: FIRST EMBODIMENT

A-1: Characteristics of This Embodiment

Before concrete explanation of an optical disc recording apparatus according to this embodiment, characteristics of the present invention will be first described.

In the CAV type optical disc recording mode, a recording laser power value is controlled in accordance with a recording linear velocity, and deterioration in the recording quality caused by variation in the recording linear velocity is suppressed.

Here, description will now be given as to the concrete control over the recording laser power in a conventional optical disc recording apparatus with reference to FIG. 1.

FIG. 1 is a diagram showing the outline of the laser power control when executing data recording in the conventional optical disc recording apparatus. As shown in the drawing, the process of laser power control is roughly divided into control 8-1 according to OPC (Optimum Power Control) which is carried out as a preliminary stage of actual recording and control 8-2 according to LPC (Laser Power Control) performed in actual recording.

The content of the control 8-1 according to OPC will be first concretely described. OPC is executed in order to determine a laser power value used for performing actual recording.

The optical disc recording apparatus performs test recording while sequentially changing a recording laser power value in several stages with respect to a predetermined area (area for OPC) of a set optical disc (step S81). Subsequently, an asymmetry degree represented by β value of a reproduction signal is detected from a signal obtained by reproducing the predetermined area where the test recording was carried out (step S82).

Here, since the β value has the correlation with respect to a C1 error value indicative of a recording quality, the recording quality can be judged from a deviation relative to a target β value. The target β value is provisionally determined at a point where the recording quality is optimally improved, namely, the C1 error value becomes small at the target β value.

FIG. 2 is a graph showing the relationship between a recording laser power value and a β value obtained by executing OPC. The optical disc recording apparatus performs the linear function approximation with respect to such a graph and analyzes the relationship between the recording laser power value and the β value. Further, the recording laser power value corresponding to the previously obtained target β value is calculated and determined (step S83).

Again referring to FIG. 1, the content of the control 8-2 according to LPC will now be described concretely. LPC is executed so that an output of optical laser (recording laser power value) used for recording becomes fixed.

The optical disc recording apparatus adjusts the output of optical laser in such a manner that a recording laser power value determined by OPC can be obtained, and starts actual data recording (step S85).

After starting actual data recording, the intensity of a laser beam is monitored by using a photo-diode or the like so as to maintain the laser power value constant, and the laser power value is controlled in such a manner that the result of monitoring becomes fixed.

Meanwhile, as described above, in the conventional apparatus, a fixed value obtained by an experiment or the like in advance is used as the target β value utilized in OPC.

The present inventor has paid attention to this target β value and considered that using the target β value as a fixed value may cause deterioration in the recording quality due to a change in recording linear velocity. IT is considered that the correlation between the recording quality (C1 error value) and the beta value differs depending on a recording linear velocity and the optimum target β value varies depending on each level of the recording linear velocity. Moreover, the inventor has effected the recording experiment by setting various target β values in accordance with each of the recording linear velocities.

As a result of this experiment, it was found that the target β value with which the recording of the high grade can be obtained differs depending on each recording linear velocity.

FIG. 3 is a graph partially showing a result of the experiment and indicating the relationship between the β value and the C1 error value obtained by reproducing an area where recording is carried out under various conditions. As shown in the drawing, when the recording velocity is changed to be eightfold, twelvefold, . . . of the standard velocity, the β value with which a value of the C1 error becomes smaller (optimum value of the target β value) varies.

FIG. 4 is a graph showing the relationship between the target β value obtained from such a recording experiment and the value of the recording linear velocity. It was also found that there is the correlation between the recording linear velocity and the optimum value of the target β value in this manner.

A-2: Structure

The present invention utilizes the above-described relationship between the recording linear velocity and the target β value which is one of parameters concerning the recoding grade. Such an optical disc recording apparatus according to an embodiment of the present invention will now be described in detail hereinafter.

FIG. 5 is a structural diagram showing an optical disc recording apparatus 100 according to the embodiment of the present invention. This optical disc recording apparatus 100 includes: an optical pickup 10; a spindle motor 11, an RF amplifier 12; a servo circuit 13; an address detection circuit 14; a decoder 15; a control portion 16; an encoder 17; a strategy circuit 18; a laser driver 19; a laser power control circuit 20; a frequency generator 21; an envelope detection circuit 22; a C1 error detection circuit 23; and a β detection circuit 24.

The spindle motor 11 is a motor which rotationally drives an optical disc (CD-R disc in this embodiment) 99 for data recording.

The optical pickup 10 has a laser diode, an optical system such as a lens or mirror and a return light photo detector. The optical pickup 10 irradiates the optical disc 99 with a laser beam in recording and reproduction, receives the return light from the optical disc 99, and outputs EFM (Eight to Fourteen Modulation)-modulated RF signal which is a light reception signal to the RF amplifier 12. In addition, the optical pickup 10 has a monitor diode. When an electronic current is caused to flow through the monitor diode by the return light from the optical disc 99, a signal corresponding to a quantity of this current is supplied to the laser power control circuit 20.

The RF amplifier 12 amplifies the EFM-modulated RF signal supplied from the optical pickup 10, and outputs the amplified RF signal to the servo circuit 13, the address detection circuit 14, the envelope detection circuit 22, the β detection circuit 24 and the decoder 15.

The decoder 15 EFM-demodulates the EFM-modulated RF signal supplied from the RF amplifier in order to generate reproduction data during reproduction. Additionally, in recording, the decoder 15 EFM-demodulates the RF signal supplied from the RF amplifier 12 when reproducing the predetermined area where the test recording has been carried out. By using this EFM-demodulated RF signal, the C1 error detection circuit 23 detects a value of the C1 error and outputs the same to the control circuit 16.

The C1 error detection circuit 23 performs error correction using an error correction code which is called CIRC (Cross Interleaved Read Solomon Code) with respect to the EFM-demodulated signal, and detects a number of frames which are not subjected to the first error correction in one sub code frame (98 EFM frames), namely, a number of times of the C1 error.

The β detection circuit 24 calculates a β (asymmetry) value as a parameter associated to a reproduction signal grade from the EFM-modulated RF signal supplied from the RF amplifier 12, and outputs a result of calculation to the control portion 16.

Here, assuming that a peak level of a waveform of the EFM-modulated signal is a and a bottom level of the same is b, the β value can be obtained from the expression $(a+b)/(a-b)$.

The address detection circuit 14 extracts a wobble signal component from the EFM signal supplied from the RF amplifier 12, decodes address time information indicative of a disc address position included in the wobble signal component, and outputs the same to the control portion 16. Since the address time information is previously recorded on the CD-R disc at fixed intervals, the control portion 15 can calculate a disc linear velocity by detecting a timing of supplying the decoded address time information.

When performing data recording on the optical disc 99, in order to search an unrecorded area, for example, the envelope detection circuit 22 detects an envelope of the EFM signal supplied from the RF amplifier 12.

The servo circuit 13 executes the rotation control over the spindle motor 11 and the focus control, the tracking control and the feed control over the optical pickup 10. The optical disc recording apparatus 100 according to this embodiment performs recording in the CAV mode which drives the optical disc 99 at a predetermined angular velocity set by a user. The servo circuit 13 drives the spindle motor 11 based on a control signal indicative of the set angular velocity supplied from the control portion 16.

The control portion 16 has a CPU and a memory constituted by a ROM, a RAM or the like, and controls each portion of the optical disc recording apparatus 100 in accordance with a control program stored in the memory in advance.

In the optical disc recording apparatus 100 according to this embodiment, the control portion 16 executes OPC before actual recording with respect to the optical disc 99, and controls each portion of the apparatus so as to perform actual recording by controlling laser power based on a result of OPC. More specifically, the control portion 16 controls each portion of the apparatus so as to perform test recording with respect to a predetermined area of the optical disc 99 set in the optical disc recording apparatus 100. Further, the control portion 16 acquires the β value detected by the β detection circuit 24 from a signal obtained when reproducing the test-recorded area, and also acquires characteristic information indicative of the relationship between the β value and the recording laser power.

Furthermore, based on the acquired characteristic information and a target β value table which is stored in the memory in advance and in which a plurality of recording linear velocities relative to the optical disc 99 and the respective target β values are associated with each other, the control portion 16 controls the laser power control circuit 20 in such a manner that a laser beam with an optimum laser power value corresponding to the varying recording linear velocity is emitted from the optical pickup 10. Here, FIG. 6 is a diagram typically showing the content of the target β value table. In this manner, the target β value table stores therein ranges of a plurality of the recording linear velocities and data of optimum values of the target β value in association with each other. The control portion 16 makes reference to this target β value table, and controls in such a manner that a laser beam with optimum laser power is emitted in accordance with the varying recording linear velocity. Moreover, this target β value table can be created under control of the control portion 16 in a factory or the like before shipment of the optical disc recording apparatus 100.

It is to be noted that the detail of laser power control by the control portion 16 or control for creating the target β value table will be described later.

The encoder 17 EFM-modulates supplied recording data and outputs it to the strategy circuit 18. The strategy circuit 18 performs time base correction processing or the like with respect to the EFM signal supplied from the encoder 17, and outputs it to the laser driver 19. The laser driver 19 drives the laser diode of the optical pickup 10 in accordance with the signal modulated in accordance with the recording data supplied from the strategy circuit 18 and the control by the laser power control circuit 20.

The laser power control circuit 20 controls the laser power emitted from the laser diode of the optical pickup 10. FIG. 7 is a block diagram showing the structure of the laser power control circuit 20. As shown in the drawing, the laser power control circuit 20 includes a monitor current detection circuit 201, a comparison circuit 202 and a control signal generation circuit 203. The monitor current detection circuit 201 is a circuit which detects a current signal supplied from the monitor diode set in the vicinity of the optical pickup 10. Since a quantity of the current flowing to the monitor diode corresponds to a quantity of a laser beam (power value) outputted from the optical pickup 10, the monitor current detection circuit 201 detects a power value of the laser beam outputted from the optical pickup 10.

The comparison circuit 202 compares a signal which is supplied from the monitor current detection circuit 201 and which corresponds to a laser power value with an LPC reference value supplied from the control portion 16, and outputs a result of comparison. Here, the LPC reference value supplied from the control portion 16 is obtained by performing a recording experiment or the like in advance, and the LPC reference value of the laser power value corresponding to the recording linear velocity is appropriately supplied based on the content of the target β value table (FIG. 6).

The control signal output portion 203 generates a control signal based on the result of comparison supplied from the comparison circuit 202 and outputs it to the laser driver 19.

With such a structure of the laser power control circuit 20, the power value of the laser beam outputted from the optical pickup can be controlled to be a value in matching with the recording linear velocity based on a result of OPC.

A-3: Operation

The operation of the optical disc recording apparatus 100 will now be described.

In the optical disc recording apparatus according to this embodiment, as described above, the laser power value is controlled while changing the target β value used in OPC in accordance with the recording linear velocity. When performing this control over the target β value, the target β value is appropriately selected by making reference to the target β value table (see FIG. 6) stored in the memory of the control portion 16.

Here, it can be considered that a recording linear velocity and a target β value to be set with this recording linear velocity which enable recording with the higher grade vary in accordance with components constituting the apparatus (for example, the optical pickup) and irregularities in characteristics of the circuit elements of the laser driver. As a countermeasure, after manufacturing each optical disc recording apparatus, the optical disc recording apparatus according to this embodiment obtains the relationship between the recording linear velocity and the target β value indicating a suitable recording linear velocity and a suitable target β value set with this recording linear velocity under control of the control portion 16, and creates the above-described target β value table.

The content of target β value table creation processing executed at, factory shipment will be described hereinafter, and the detail of the actual recording during use by a user will be then explained.

2¦ Operation when Creating Target β Value Table>

Description will be first given as to the operation for creating the target β value table. In the target β value table creation processing, a plurality of target β values are set in accordance with each of a plurality of recording linear velocities, and test recording is then carried out with respect to the optical disc. Thereafter, a target β value which enables recording with the higher grade is determined in accordance with each of a plurality recording linear velocities based on a result of reproduction of the test recording, and the target β value table is created based on a result of determination. The operation when creating such a target β value table will be explained hereinafter based on a concrete example.

FIG. 8 is a flowchart showing an example of the detail of the operation by the control portion 16 when creating the target β value table.

When the optical disc 99 is set in the optical disc recording apparatus 100 by an operator in a factory and start of test recording is instructed, the control portion 16 drives the optical disc 99 at a predetermined linear velocity (here, an octuple velocity of the standard velocity) and starts test recording (step Sa1).

Giving concrete explanation, the control portion 16 supplies a signal for test recording to the encoder 17 in order to carry out test recording, and sequentially changes the recording laser power value in predetermined fifteen levels by controlling the laser power control circuit 20.

By controlling each portion in the apparatus, the control portion 16 records the EFM signals for one sub code frame every time the laser power value is changed, and executes test recording for recording the EFM signals for a total of 15 frames.

Thereafter, the control portion 16 determines an optimum value Tβ8 of the target β value when the recording linear velocity is the octuple velocity by using the C1 error value which can be obtained by reproducing the test-recorded area and the β value (Step Sa2).

FIG. 9 is a graph showing the relationship between the C1 error value and the β value obtained at the moment. The control portion 16 performs the quadratic curve approximation with respect to the collected data, and determines the preferred β value with which the C1 error value becomes small as the optimum value Tβ8 of the target β value when the recording linear velocity is an octuple velocity. It is to be noted that the data interpolation other than the quadratic curve approximation may be used and, for example, the minimum root-squaring method or the spline interpolation method can be adopted.

Subsequently, the control portion 16 drives the optical disc 99 at a linear velocity which is twelvefold of the standard velocity, and performs the test recording similar to that carried out at the above-described octuple velocity (step Sa3). In this case, the control portion 16 likewise controls each portion of the apparatus, records EFM signals for one sub code frame every time the laser power value is changed in the fifteen levels, and executes test recording for recording the EFM signals for a total of 15 frames.

Then, the control portion 16 analyzes the relationship between the C1 error value obtained by reproducing the test-recorded area and the β value, and determines an optimum value Tβ12 of the target β value at the time of setting the recording linear velocity to the twelvefold velocity (Step Sa4).

Thereafter, the control portion 16 drives the optical disc 99 at sixteenfold and twentyfold linear velocities, and likewise performs test recording. Then, by reproducing the recorded data, the optimum values Tβ16 and Tβ20 of the target β value when the recording linear velocity is set to sixteenfold and twentyfold velocities are determined (Steps Sa5 to Sa8), respectively.

Then, the control portion 16 obtains the relationship between the linear velocity Vdisc (=eightfold velocity, twentyfold velocity, . . . ) of the disc 99 and the determined optimum value Tβn (n=8, 12, . . . ) of the target β value. Here, the disc linear velocity Vdisc has a value corresponding to the recording linear velocity. FIG. 10 is a diagram in which the relationship between the recording linear velocity Vdisc and the optimum value TRBn of the target β value is plotted. The control portion 16 obtains values of constants A and B satisfying the following linear expression with respect to the relationship between the recording linear velocity Vdisc and the optimum target β value and carries out the linear function approximation.

$$T\beta n = A \times Vdisc + B$$

A, B; constants
Tβn; optimum value of the target β value (n is an integer number)
Vdisc; recording linear velocity In this manner, after obtaining the relational expression of the recording linear velocity Vdisc and the optimum value Tβn of the target β value, the control portion 16 creates a target β value table (see FIG. 6) indicative of the relationship between the parameters, and stores the table in the memory of the control portion 16 (step Sa9). The above is the detail of the operation in creation of the target β value table which is executed in a factory or the like before shipment of the optical disc recording apparatus 100.

Incidentally, as to the content of the target β value table typically shown in FIG. 6, the value Tβ1 is stored as an optimum value of the target β value when the recording linear velocity is onefold to twofold of the standard velocity. Further, the value Tβ2 is stored when the recording linear velocity is twofold to threefold, and the value Tβ3 is stored when the recording linear velocity is threefold to fourfold, . . . , for example.

2¦ Operation in Use by User>

The detail of the operation in use by a user will now be described with reference to FIG. 11.

When the optical disc 99 is set in the optical disc recording apparatus 100 by a user and start of data recording is directed with a disc recording velocity being specified, the control portion 16 executes OPC (Optical Power Control) before performing actual recording, and determines a laser power value for carrying out data recording (step Sb1).

The control portion 16 first sets the recording linear velocity to the octuple velocity and executes OPC. In this case, the control portion 16 acquires the target β value corresponding to the case where the recording linear velocity is the octuple velocity from the content of the target β value table, and performs OPC by using this target β value.

Thereafter, the control portion 16 controls each portion of the optical disc recording apparatus 100 in order to perform test recording in a predetermined area (area for OPC) in the optical disc 99. Specifically, a signal for test recording is transmitted to the encoder 17, and the recording laser power value is sequentially changed in predetermined fifteen levels by controlling the laser power control circuit 20. In this manner, the control portion 16 records the EFM signals for one sub code frame every time the laser power value is changed, and executes test recording for recording the EFM signals for a total of 15 frames.

Then, the control portion 16 reproduces the test-recorded area, and analyzes a value of the β value detected from the reproduction signal by the β detection circuit 24, thereby determining the optimum laser power value corresponding to the target β value to the octuple velocity (step Sb2).

Then, the control portion 16 sets the recording linear velocity to the twentyfold velocity and executes similar OPC test recording. Furthermore, the control portion 16 uses the target β value when the recording linear velocity is the twelvefold velocity from the content of the target β value table and determines the laser power value corresponding to this target β value.

FIG. 12 is a graph showing an example of the relationship between the recording laser power value and the β value which can be obtained as a result of performing the above-described OPC test recording. The control portion 16 obtains the relationship between the recording linear velocity and the recording laser power value by the linear function approximation based on the relationship between the recording laser power value and the β value shown in this graph. As a result, as indicated by a solid line in FIG. 13, it is possible to obtain information indicative of the relationship between the recording linear velocity and the recording laser power value with which optimum recording can be carried out.

With such analysis, the relationship between the recording linear velocity and the optimum recording laser power can be obtained, and the control portion 16 controls the laser power in accordance with the recording linear velocity in conformity to this relationship. However, control over the laser power can be carried out by controlling a value of the current supplied to the optical pickup. Then, the relationship between the recording linear velocity obtained as described above and the optimum recording laser power can be acquired, and description will now be given as to the concrete operation when the control portion 16 controls the laser power in accordance with this relationship.

The control portion 16 analyzes the relationship between the β value and a monitor current value Imon detected by the monitor current detection circuit 201 of the laser power control circuit 20 (step Sb3). Specifically, when executing the above-described test recording based on OPC, the control portion 16 records the monitor current value Imon detected by the monitor current detection circuit 201 of the laser power control circuit 20. Then, the control portion 16 obtains the relational expression of the recorded monitor current value Imon, i.e., the monitor current value Imon corresponding to the laser power value and the β value obtained in reproduction evaluation. The control portion 16 obtains values of constants C and D satisfying the following linear expression with respect to the acquired relationship between the β value and the monitor current value Imon, and performs the linear function approximation.

$$Imon = C \times \beta + D$$

C, D; constants

Imon; monitor current value detected by the monitor current detection circuit 201

β; β value

The control portion 16 stores the thus obtained relational expression of the β value and the monitor current value Imon in a working area of the RAM or the like. Then, the control portion 16 controls supply of the current to the optical pickup 10 by using this relational expression, and effects actual information recording (step Sb6). The control portion 16 controls the laser power control circuit 20 in such a manner that a laser beam having an optimum laser power value determined by executing OPC can be emitted from the optical pickup 10, and starts actual recording. Upon starting such actual recording, the control portion 16 detects a timing of supply of address information detected from the address detection portion 14 to the control portion 16, and then detects the linear velocity of the disc, namely, the recording linear velocity. Subsequently, based on the detail stored in the target β value table, the control portion 16 judges the target β value optimum for the detected recording linear velocity. Moreover, the control portion 16 obtains the monitor current value Imon corresponding to the target β value from the relational expression of the β value and the monitor current value Imon, and determines this value as an LPC parameter P1. In addition, the control portion 16 outputs a value of the LPC parameter P1 to the comparison circuit 202 of the laser power control circuit 20, and controls the recording laser power value. That is, in case of recording at a given recording linear velocity, the control portion 16 obtains the monitor current value which can be calculated by substituting the target β value corresponding to this recording linear velocity in the above relational expression, and controls the laser power value in such a manner that the actual monitor current value detected from the monitor current detection circuit 201 can be made equal to this current value. With such control of the supply current, the value of the laser power emitted from the optical pickup 10 is controlled, and the optical disc 99 can be irradiated with a laser beam having the optimum intensity irrespective of fluctuation in the recording linear velocity.

As described above, according to the optical disc recording apparatus 100 of the present invention, even in cases where the recording linear velocity greatly varies between the inner periphery and the outer periphery of the optical disc 99 when data recording is carried out based on CAV at a high velocity, it is possible to control the laser power in such a manner that the optical disc 99 can be irradiated with a laser beam having the optimum intensity in accordance with the recording linear velocity. Therefore, even if the recording velocity varies as in CAV recording, execution of adequate data recording according to the varying recording linear velocity can be guaranteed. For example, in case of performing CAV recording that the recording linear velocity at the innermost periphery is the eightfold velocity and the recording linear velocity at the outermost periphery is the twentyfold velocity, characteristics such as indicated by a broken line in FIG. 13 can be obtained when the target β value is a fixed value as in the conventional apparatus, it is a target β value suitable for the eightfold velocity or it is a target β value suitable for the twentyfold velocity. That is, in OPC, by obtaining the relationship between the recording linear velocity and the laser power value by using the target β value suitable for octuple velocity recording, it can be understood that the recording is not necessarily carried out with the optimum recording laser power when recording at a linear velocity other than the octuple velocity. For example, in case of recording at the twentyfold velocity, recording is executed by emitting a laser beam with the intensity which is greater than the optimum laser power value by AP. On the contrary, in this embodiment, as indicated by a solid line in FIG. 13, recording using the substantially optimum laser power can be effected even if recording is carried out at any of eightfold to twentyfold recording linear velocities.

Additionally, since the target β value table is created in accordance with each apparatus before shipment, an optimum target β value can be set in accordance with each apparatus. Also, the further optimum laser power control can be executed in each apparatus by performing laser power control using the target β value, thereby enabling more stable recording.

A-4: Modifications

The above-described first embodiment is only one embodiment according to the present invention. It does not restrict the detail of the present invention, and modifications can be arbitrarily added within a scope of the present invention. For example, there are the following modifications.

A-4-1: Modification 1

Although the target β value table in which each value of the recording linear velocity is associated with the target β value is stored in the memory of the control portion 16 in the above-described embodiment, the relational expression (corresponding to the expression of "Tβn=A×Vdisc+B" in the foregoing embodiment) of each value of the recording linear velocity of a target value TRBref of the target β value may be stored in the memory instead of storing the target β value table.

Even in this case, the control portion 16 can calculate an optimum target β value according to each of a plurality of the recording linear velocities by detecting a value of the recording linear velocity in recording and substituting it in the function stored in the memory. Further, by executing OPC or the like by using the calculated target β value, the high-grade recording can be stably executed as similar to the foregoing embodiment.

A-4-2: Modification 2

In the above-described embodiment, before making shipment of the optical disc recording apparatus 100 from a factory or the like, the control portion 16 carries out test recording in accordance with a predetermined program previously stored in the memory, creates and stores the target β value table in which each value of the recording linear velocities and the target β value is associated with each other. However, a control program for test recording or an analysis program for obtaining the relational expression of the value of the recording linear velocity and the target β value may not be stored in the memory of the control portion 16.

For example, a dedicated apparatus for performing test recording is provided in a factory, and a control program for test recording or another control program is stored in a memory in this dedicated apparatus. Furthermore, before making shipment of the optical disc recording apparatus 100 from the factory, when the optical disc recording apparatus 100 is temporarily connected to the dedicated apparatus via a cable by an operation of an operator or the like, the control portion 16 may cause the control program stored in the dedicated apparatus to be executed, create the target β value table in which each value of the recording linear velocities is associated with the target β value, and store it in the memory in the control portion 16.

Alternatively, the dedicated apparatus in the factory may have a CPU, perform a series of test recording and data analysis mentioned above and store the created target β value table in the memory of the control portion 16 under control of the CPU.

A-4-3: Modification 3

Although the control portion 16 creates the target β value table in which each value of the recording linear velocities is associated with the optimum target β value in the above-described embodiment, a target β value table in which a disc address position (address information) is associated with an optimum target β value in place of the recording linear velocity may be created as shown in FIG. 14.

For example, when the optical pickup 10 is configured to perform CAV recording at only a single angular velocity, the address information and the value of the recording linear velocity have the one-to-one correspondence relationship. Therefore, by configuring the control portion 16 to detect the address information and execute OPC or the like by using the target β value according to this address, the advantages similar to those of the above-described embodiment can be obtained.

Moreover, if the optical disc recording apparatus 100 is configured to selectively execute CAV recording at a plurality of angular velocities, a table in which a disc address position (address information) is associated with an optimum target β value in accordance with each angular velocity may be used as shown in FIG. 15. In this case, when CAV recording is executed at a given angular velocity, it is good enough that the control portion 16 makes reference to a part corresponding to this angular velocity in the table shown in FIG. 15. In this manner, the address information which is uniquely specified information by a recording linear velocity (when the rotational velocity is fixed) and characteristic information or the like indicative of the correspondence relationship relative to the target β value may be stored in the memory or the like instead of the correspondence relationship of the recording linear velocity and the target β value, and this characteristic information may be used to perform OPC as with the foregoing embodiment. The "recording linear velocity" used in claims of this application means to include information which is uniquely specified by the recording linear velocity.

A-4-4: Modification 4

Although the relationship between the recording linear velocity and the optimum target β value is obtained before making shipment of the optical disc recording apparatus 100 from a factory in the foregoing embodiment, it may be obtained at a stage of actual recording by a user.

For example, at the time of OPC, test recording may be carried out while varying some of values of the recording linear velocities as well as the recording laser power, and such a target β value table as described in connection with the foregoing embodiment may be created every time OPC is executed. By doing so, even if the laser characteristics of the optical pickup 10 vary due to the influence of an environmental temperature or the like, execution of optimum data recording according to the circumstance such as an environmental temperature can be guaranteed.

A-4-5: Modification 5

Although the optical disc recording apparatus 100 according to the above-described embodiment performs CAV recording, any other recording mode may be adopted.

For example, there is a recording mode by which the disc is divided into three areas, i.e., the inner periphery, the middle periphery and the outer periphery and a disc rotational velocity differs in accordance with each area (ZCLV: Zoned Constant Velocity), but preparing a target β value corresponding the recording linear velocity as a data target β value table in advance can obtain the advantages similar to those in the above embodiment.

A-4-6: Modification 6

Furthermore, as shown in FIG. 16, it is also possible to apply the present invention to an optical disc recording apparatus which carries out so-called partial CAV recording, by which CAV recording that the rotation angular velocity of the optical disc is fixed is executed until a given set recording linear velocity V is reached, and CAV recording at a recording linear velocity V is carried out when or after the recording linear velocity reaches the set recording linear velocity V by movement of a recording position to the outer peripheral side.

In case of applying the present invention to the optical disc recording apparatus which performs such partial CAV recording, a table which stores therein each recording linear velocity and data of optimum values of the target β value in association with each other as shown in FIG. 17 is recorded in the memory of the control portion 16. As shown in the drawing, this table stores each target β value in association with each maximum velocity of partial CAV recording (corresponding to the set recording linear velocity V) such as the twelvefold velocity, the sixteenfold velocity and the twentyfold velocity which can be executed in the optical disc apparatus.

Moreover, if a user directs execution of recording at the twelvefold recording linear velocity at the innermost periphery and the sixteenfold velocity at the outermost periphery (corresponding to the set recording linear velocity), upon acquiring the detail of this direction inputted from a non-illustrated input portion or the like, the control portion 16 controls the spindle motor 11 through the servo circuit 13 in such a manner that recording at the linear velocity according to the acquired indication content can be executed. In addition, at the time of recording based on this direction, the control portion 16 obtains the relationship between the recording linear velocity and the optimum laser power value by using the target β value according to the recording linear velocity (=sixteenfold velocity) at the outermost periphery in OPC, and controls the laser power control circuit 20 in such a manner that the optical disc 99 can be irradiated with a laser beam having the intensity according to the relationship between the recording linear velocity and the optimum laser power value.

A-4-7: Modification 7

In regard to the relational expression of the recording linear velocity and the target β value and the relational expression of the laser power value and the β value, although the linear function approximation is performed in the foregoing embodiment, any other approximation may be used. That is, since supplementing other data from the data obtained by test recording can suffice, the quadric function approximation, the cubic function approximation, the logarithmic function approximation, the exponential function approximation or the like may be used.

A-4-8: Modification 8

Although the relational expression of the recording linear velocity and the target β value is calculated in accordance with each optical disc recording apparatus 100 in the foregoing embodiment, the relational expression may be obtained in accordance with each type of the optical disc 99 on which data is recorded.

For example, the relational expression of the recording linear velocity and the target β value may be previously obtained in accordance with a disc manufacturer name or a property of a recording film (property such as reflectivity, recording sensitivity or the like) of the optical disc 99, and it is recorded in the memory of the control portion 16.

Then, in data recording, before executing OPC, the control portion 16 reproduces a predetermined position on the optical disc 99 set by a user, judges information such as a disc manufacturer name of the optical disc and determines the target β value based on a result of this judgment. As a result, it is possible to execute laser power control of OPC or the like according to the property of each optical disc 99.

A-4-9: Modification 9

In the above-described embodiment, when the recording linear velocity varies in recording adopting the CAV mode, the optimum laser power value with which the high-grade recording is enabled irrespective of fluctuation in the recording linear velocity is obtained by performing OPC utilizing the target β value suitable for a plurality of recording linear velocities. However, in order to assuredly reflect a result of further appropriate OPC to actual recording, a response speed of control over the laser power value by the laser power control circuit 20 may be caused to fluctuate in accordance with the recording linear velocity. That is, it is possible to execute control for switching the servo gain of the laser power control circuit 20. For example, a response speed of control for matching an outgoing laser power value with a target laser power value executed by the laser power control circuit 20, namely, the servo gain may be set smaller when the recording linear velocity is low, and the servo gain may be set larger when the recording linear velocity is high. By doing so, excessive sudden fluctuation in the outgoing laser power value is suppressed by setting the servo gain smaller when the recording linear velocity is low. On the other hand, when the recording linear velocity is high, rapidly controlling the laser power value to an appropriate value is required, but the follow-up speed to a target value can be improved by increasing the servo gain.

The above-described servo gain switching control can be realized by the following structure, for example. A plurality of types of low-pass filters having different time constants are prepared in the laser power control circuit 20, and these low-pass filters (which are provided at the rear stage or the like of the comparison circuit 202 in the example shown in FIG. 7) are selectively used in accordance with a direction or the like from the control portion 16. Further, when the control portion 16 supplies a signal indicative of a low-pass filter to be used to the laser power control circuit 20, the servo gain of the laser power control circuit 20 can be switched in accordance with the recording linear velocity.

A-4-10: Modification 10

In the above-described embodiment, when determining an optimum value of the target β value, the C1 error value when reproducing the recorded area is evaluated by changing the target β value. It is, however, possible to determine an optimum value of the target β value by measuring various kinds of parameters concerning the recording quality, for example, a jitter value, a deviation value or a reflectivity. Further, an optimum value of the target β value may be determined by using a result of measuring a plurality of these parameters. Furthermore, OPC may be carried out by using characteristic information in which any other parameter associated to the recording quality, e.g., the C1 error instead of the β value is associated with a plurality of recording linear velocities.

A-4-11: Modification 11

In the above-described embodiment, although the CD-R is supposed as the optical disc 99, the present invention may be applied to an optical disc recording apparatus which performs data recording on any other optical disc such as a CD-RW disc, a DVD-RW disc, or a DVD-RAM disc.

B: SECOND EMBODIMENT

As described above, it is found from the recording experiment carried out by the present applicant that there is a phenomenon that an optimum target β value also varies when the recording linear velocity is changed.

The optical disc recording apparatus 100 according to the first embodiment takes such a phenomenon into consideration and performs recording by controlling a recording laser power value by using a value of the target β value according to the recording linear velocity, namely, the LPC parameter P1. That is, when the recording linear velocity varies, a value of the recording laser power is changed, and execution of the high-grade data recording is thereby guaranteed.

The present inventor has paid attention to the possibility of execution of the high-grade data recording in the CAV mode by which the recording linear velocity varies depending on a recording position by improving the optical disc itself.

As well known, the disk is formed along a track of the disk with a material that the reflectivity at an irradiated part changes when an optical disc used for data recording is irradiated with the optical laser having a predetermined or higher intensity, which is a so-called recording film (pigment film). Moreover, since it is preferable that uniform data recording is carried out when the optical disc is irradiated with an optical beam having the same intensity, the optical disc is manufactured in such a manner that a thickness of the recording film to be formed is fixed irrespective of a track position on the disc.

The present inventor has paid attention to a thickness of the recording film formed on the optical disc, and considered that the fixed thickness of the recording film is a factor of deterioration in the recording quality caused by a change in the recording linear velocity. That is, as in CLV recording, it is preferable that a thickness of the recording film is fixed irrespective of a disc address position under the recording condition that the recording linear velocity is always fixed. However, in CAV recording, since the thickness of the recording film is fixed when the recording linear velocity changes depending on a disc address position, the present inventor has considered that the high-grade data recording is impossible unless a recording laser power value is changed.

As described in connection with the foregoing embodiment, according to a result of performing the recording experiment with respect to a general optical disc having a recording film with a substantially uniform thickness, when the recording linear velocity is changed, the target β value also varies, and thus the power optimum value of the recording laser to be emitted also varies. In addition, there is the fixed correlation between the recording linear velocity and the power optimum value of the recording laser. On the other hand, it is also understood that there is the fixed correlation between the recording laser power value and a thickness of the recording film formed on the disc. Thus, the recording film is formed on the disc in such a manner that the film thickness is changed depending on the recording linear velocity proportional to the disc address position. The high-grade data recording can be effected with the fixed recording laser power value even if the recording linear velocity varies depending on the disc address position as in CAV recording.

Here, in regard to the relationship between a film thickness value of the recording film formed on the disc and a disc address position, the following relational expression can be assumed, for example.

$$\text{Film thickness} = X n \times \text{disc address position} + Y$$

X, Y and n; constants

Here, X, Y and n are constants obtained by the recording experiment or the like (X is a negative value, and the film thickness is reduced toward the outer peripheral side), and they are values determined by a material of the recording film or any other property of the disc (structural characteristics such as reflectivity or warpage).

FIGS. 18 and 19 are sectional diagrams typically showing the side surface of the optical disc which is changed in accordance with a disc address position while taking the obtained relationship between the address position and the film thickness of the recording film into consideration. In FIG. 18, for example, as in CAV recording, the thickness of the recording film is continuously changed so as to cope with the recording mode in which the recording linear velocity continuously varies. As a method for manufacturing the recording film having such a thickness, a spin coating method or the like can be used. Furthermore, in FIG. 19, for example, as in ZCLV recording, the thickness of the recording film is stepwise changed so as to cope with the recording mode in which the recording linear velocity stepwise varies depending on a predetermined area of the optical disc.

According to the optical disc of the present invention, even if data recording is carried out at a high speed in, e.g., CAV and the recording linear velocity greatly varies between the inner periphery and the outer periphery of the disc, the optical disc recording apparatus can constantly perform high-grade data recording by controlling in such a manner that the recording laser power value can be fixed. It is possible to provide the optical disc on which high-grade data recording can be stably carried out without executing the complicated laser power control.

C: THIRD EMBODIMENT

C-1: Laser Power Control Method

A laser power control method according to a third embodiment of the present invention will now be described. The entire structure of the optical disc recording apparatus used for carrying out the laser power control method according to the third embodiment is similar to that of the optical disc recording apparatus 100 according to the first embodiment (see FIG. 5), but different from the first embodiment in that the method according to the third embodiment adopts ROPC (Running Optimum Power Control) in order to control laser power in recording. Therefore, the explanation of the apparatus structure for carrying out the laser power control method according to the third embodiment will be omitted, and the detail of laser power control processing in recording different from the first embodiment will be mainly described hereinafter. It is to be noted that main constituent elements executing the power control processing are denoted by the same reference numerals as those of the optical disc recording apparatus 100.

As well known, the laser power control method according to the conventional ROPC detects a level of the reflected light (output signal level of the RF amplifier 12) from the optical disc in actual recording of information, and controls a value of laser power emitted from the optical pickup 10 so that a level value of this output signal or a value uniquely specified by this level value can coincide with a predetermined target value.

The laser power control according to the conventional ROPC is used in a recording mode such as a CLV mode that the recording linear velocity is fixed, and controls the laser power value in such a manner that the laser power value can coincide with a fixed value obtained by an experiment in advance. With such a technique, when the recording linear velocity varies as in the CAV mode and the intensity of the emitted laser power largely varies in accordance with this change, it cannot be said that the above-described conventional ROPC can effect excellent recording. Even if good recording can be executed when recording at a given recording linear velocity, there sometimes occurs a problem that a recording error is often caused when recording at any other recording linear velocity.

As a countermeasure, the laser power control method according to this embodiment performs ROPC capable of controlling the laser power so as to enable optimal recording irrespective of variations in velocity even if the recording linear velocity varies in recording of the CAV mode or the like, and description will be given as to the detailed content of the laser power control method including this ROPC hereinafter.

As shown in FIG. 20, in the laser power control method according to this embodiment, the control portion 16 controls each portion of the apparatus in order to perform OPC (step Sc1). As well known, OPC is processing which carries out test recording with respect to a PCA (Power Calibration Area) area (see FIG. 21) of the optical disc 99 (description will be given by taking a CD-R or a CD-RW as an example) before actual recording and obtains an optimum laser power value based on a result of this test recording. In this embodiment, recording is carried out in the CAV mode, and the control portion 16 controls the servo circuit 13 in such a manner that the optical disc 99 is rotated in the test recording of this OPC at the same angular velocity as that of the actual recording. In one test recording session of in the optical disc recording apparatus 100, the recording laser power value is changed in fifteen levels, the EFM signals for one sub code frame are recorded in accordance with each one recording laser power value, and the EFM signals for a total of 15 frames are recorded.

Here, area arrangement of the optical disc 99 (CD-R) where test recording is performed will be described with reference to FIG. 21. A section having a diameter of 46 to 50 mm in the optical disc 99 is prepared as a lead-in area 114. Also, a program area 118 on the outer peripheral side where data is recorded and a remaining area (not shown) positioned on the outer peripheral side of the program area 118 are prepared. On the other hand, on the inner peripheral side away from the lead-in area 114, an inner peripheral side PCA (Power Calibration Area) area 112 is prepared. In the inner peripheral side PCA area 112, there are prepared a test area 112a and a count area 112b, and test recording in the above-described recording processing before actual recording is effected in this test area 112a. Here, as the test area 112a, an area where test recording can be performed for multiple times is prepared. Further, an EFM signal indicative of which part in the test area 112a recording is completed at the end of test recording is recorded in the count area 112b. When performing test recording with respect to this optical disc 99 for the next time, therefore, a position in the test area 112a from which test recording should be started can be revealed by reading the EFM signal in the count area 112b. In this optical disc recording apparatus 100, test recording is carried out in the above-described test area 112a before actual recording.

The control portion 16 drives the optical disc 99 to rotate at the same angular velocity as that in the actual recording mentioned above, and performs test recording with respect to this optical disc 99. Then, the control portion 16 obtains such a laser power value as that the β value detected by the β detection circuit 24 coincides with a preset target β value based on a signal obtained when reading the test-recorded area. That is, the control portion 16 drives the optical disc 99 at the same angular velocity as that in the actual recording with respect to the PCA area on the inner peripheral side of the optical disc 99, and obtains an optimum laser power value when performing the recording by executing the OPC.

The control portion 16 carries out test recording with respect to the test area 112a by driving the optical disc 99 to rotate at the same angular velocity as that in actual recording as described above, and obtains an optimum laser power value from the reproduction signal. Then, the apparatus starts actual recording. More specifically, the control portion 16 controls the laser power control circuit 20 or the like in such a manner that the optimum laser power value obtained by the OPC becomes an initial value of a power of a laser beam emitted from the optical pickup 10 to the optical disc 99, and starts actual recording (step Sc2).

When actual recording starts with the above-described power value being used as an initial value, the control portion 16 detects a level of the reflected light (level of an output signal from the RF amplifier 12) from the optical disc 99, and controls a laser power output in such a manner that a level value of this output signal or a value uniquely specified by this level value (value associated to return light) can be equal to a target value. That is, a laser beam emitted from the optical pickup 10 is controlled in such a manner that the laser power value at the time of starting actual recording coincides with the optimum laser power value obtained by the above-mentioned OPC, and thereafter the laser power is controlled by ROPC (step Sc3).

FIG. 22 shows an example of the output signal from the RF amplifier 12 in recording. As shown in the drawing, the output signal from the RF amplifier 12 includes an element of a peak portion T1 when the laser rises and an element of a shoulder portion T2 when the level then becomes constant. In this embodiment, the control portion 16 controls the power of the laser beam emitted from the optical pickup 10 by using a level Lb (or La/Lb) of the above-described shoulder portion (which will be referred to as a shoulder level hereinafter) obtained from the return light. Here, the control portion 16 controls the laser power so as to obtain an optimum shoulder level in accordance with the recording velocity which varies because of recording in the CAV mode by using the relationship between the laser power which varies according to the recording velocity previously obtained by an experiment or the like and the shoulder level.

The conventional laser power control based on ROPC likewise utilizes the relationship between the shoulder level at which optimum recording is enabled at a given fixed recording linear velocity and the laser power. In this embodiment, as shown in FIG. 23, the relationship between the shoulder level enabling such optimum recording and the laser power is obtained in accordance with each of a plurality of velocities (in the illustrated example, the twelvefold velocity, the sixteenfold velocity, the twentyfold velocity, twenty-fourfold velocity or the like) by performing an experiment in advance, and the correlation between the shoulder level and the laser power taking the recording linear velocity and variations in velocity into consideration is obtained by approximating the results of the obtained relation with a function (in the illustrated example, the linear function). More specifically, values of the shoulder levels Lb12, Lb16, Lb20 and Lb24 (or La/Lb) when the target β value (for example, β=0) is obtained are calculated in accordance with each of a plurality of recording linear velocities, and there is obtained the relationship between the recording linear velocity and the shoulder level Lb (or La/Lb) with which the preferable recording can be possibly performed as shown in FIG. 23. The relationship can be represented by the linear function obtained by approximating the obtained values with the function.

For example, when the relationship between the shoulder level Lb and the recording linear velocity is represented by the following expression as a result of an experiment, the shoulder level Lb at the recording linear velocity V which sequentially varies in recording of the CAV mode can be derived by introducing this recording linear velocity V in the function.

$$Lb/V = A$$

It is to be noted that A is a fixed value (gradient of the approximate linear function) obtained by the above-mentioned experiment.

The control portion 16 controls the laser power control circuit 20 in such a manner that the optical pickup 10 emits a laser beam having such an intensity as that the shoulder level of the reflected light from the optical disc 99 coincides with a target shoulder level Lb which is sequentially derived in accordance with variations in the recording velocity by the above expression in actual recording. Then, the control portion 16 controls power of a laser beam emitted from the optical pickup 10 by the above-described ROPC until the actual recording ends.

The above is the laser power control method according to the third embodiment, and it is possible to perform the recording maintaining the excellent grade irrespective of variations in velocity by carrying out recording with respect to the optical disc 99 using this laser power control method even if the recording linear velocity varies during recording as in the CAV mode. That is, even if the recording linear velocity varies, the laser power is controlled in such a manner that a shoulder level value according to each recording linear velocity can be obtained, i.e., the β value coincides with a target value in recording at each recording linear velocity. It is, therefore, possible to effect the laser power control which constantly matches the β value with the target β value irrespective of the recording linear velocity.

In the CAV mode or the like, there has been conventionally used a technique coping with variations in velocity by obtaining the relationship between the recording linear velocity and the power value, namely, a power function by OPC and performing the laser power control in accordance with the power function. This technique, however, uses the power function obtained from a result of test recording executed before the actual recording. That is, this technique just assumes the laser power value with which excellent recording may possibly performed in actual recording from a result of test recording executed with respect to the test area 112a on the inner peripheral side of the disc, and excellent recording which enables the laser power control in accordance with the power function cannot be necessarily performed. On the contrary, in the laser power control using ROPC, the return light in the actual recording is detected and the laser power is controlled. That is, the laser power can be controlled while ascertaining the actual recording situation, and it can be said that the laser power control which can maintain the excellent recording quality is possible as compared with the case using the above-described power function. On the other hand, it can not be said the conventional ROPC can necessarily perform excellent recording in the recording mode in which the recording linear velocity varies as with the above-described CAV mode. In this embodiment, by adopting ROPC which varies a target parameter (shoulder level value in the above case) in accordance with variations in recording velocity as mentioned above, it is possible to exploit an advantage of ROPC such that control is possible while ascertaining the recording situation in actual recording and suppress deterioration in recording quality caused by variations of velocity in recording.

C-2: Modification

The above-described third embodiment is just an embodiment and does not restrict the detail of the present invention, and modifications can be arbitrarily added within a scope of the present invention. For example, there are the following modifications.

C-2-1: Modification 1

Although the above-described third embodiment obtains the relationship between the recording linear velocity and the shoulder level such that the target β value becomes constant (for example, β=0) irrespective of the recording linear velocity (see FIG. 23) when acquiring the relationship between the shoulder level Lb and the recording linear velocity, the target β value may be changed in accordance with fluctuations in recording linear velocity. That is, since there is such a tendency as that the β value becomes smaller as the recording linear velocity increases in various kinds of optical discs, a value of the target β value may be set smaller as the recording linear velocity increases. For example, as shown in FIG. 24, four target β values, i.e., 3%, 0%, −3% and −6% are set, and the shoulder level value with which each target β value can be obtained is acquired by the experiment in accordance with a plurality of recording linear velocities, i.e., twelvefold velocity, the sixteenfold velocity, the twentyfold velocity and the twenty-fourfold velocity. Then, the shoulder level value corresponding to the target β value=3% is adopted for the twelvefold velocity; the shoulder level value corresponding to the target β value=0%, the sixteenfold velocity; the shoulder level value corresponding to the target β value=−3%, the twentyfold velocity; and the shoulder level value corresponding to the target β value=−6%, the twenty-fourfold velocity. Further, the relationship between the shoulder level and the laser power (correlation) taking the recording linear velocity and fluctuations in velocity into consideration is obtained by approximating these values by a function (quadric function in the illustrated example).

In conformity to the thus obtained relationship between the recording linear velocity and the shoulder level, the control portion 16 controls the laser power control circuit 20 in such a manner that the shoulder level of the reflected light from the optical disc 99 can satisfy the thus obtained relationship in actual recording as similar to the third embodiment. By doing so, the β value can constantly coincide with the target β value irrespective of the recording linear velocity as similar to the third embodiment, thereby enabling high-grade recording. Furthermore, since this modification obtains the relationship between the recording linear velocity and the target shoulder level taking into consideration a phenomenon that the β value enabling excellent recording becomes smaller as the recording linear velocity increases, recording with the higher grade can be executed.

C-2-2: Modification 2

Moreover, in the above-described third embodiment, the laser power emitted from the optical pickup 10 is controlled by using the relationship between the shoulder level Lb and the recording linear velocity V (Lb/V=A). It is, however, also possible to obtain the relationship between three parameters, i.e., the shoulder level Lb, the recording linear velocity V and the laser power value P by an experiment in advance and control the laser power in accordance with the thus obtained relationship between the three parameters, namely, the shoulder level Lb, the recording linear velocity V and the laser power value P. For example, the control portion 16 uses the relationship between the laser power which varies in accordance with the recording velocity previously obtained by an experiment or the like and the shoulder level, and controls the laser power so as to realize the optimum shoulder level in response to the recording velocity which varies because of recording in the CAV mode. More specifically, assuming that the laser power is P and the recording velocity is V, the laser power value P is controlled in such a manner that the following expression becomes a fixed value obtained by an experiment in advance.

$$Lb^a \times P^b \times V^c \times n \quad \text{(Expression 1)}$$

In the above expression, a+b+c×n=0 is established, and a, b, c and n are constants obtained from the relationship between the shoulder level and the laser power which varies in accordance with the recording velocity previously obtained by an experiment. The conventional laser power control adopting ROPC also utilizes the relationship between the shoulder level and the laser power at a given fixed velocity. In this embodiment, such a relationship between the shoulder level and the laser power is obtained by performing an experiment at each of a plurality of velocities in advance, and the relationship between the shoulder level and the laser power taking the recording linear velocity and fluctuations in velocity into consideration is obtained by approximating results by using a function. For example, if a=2, b=−1 and n=1, c=−1 is established, and a, b, c and n such that the value of (Expression 1) has the order of 0, namely, it becomes a constant are obtained.

Then, the control portion 16 controls the laser power control circuit 20 in such a manner that the optical pickup 10 can emit a laser beam having the laser power calculated by using the above-mentioned (Expression 1) obtained by the experiment in advance. By doing so, as similar to the third embodiment, the β value can constantly coincide with the target β value irrespective of the recording linear velocity, thereby enabling the high-grade recording. Further, in this modification, since the laser power is controlled in accordance with the relational expression taking fluctuations in the shoulder level involved by changes in the recording linear velocity into consideration, recording with the higher grade can be performed.

C-2-3: Modification 3

Furthermore, in the above-described third embodiment, an initial value of the recording laser power in actual recording is obtained with respect to the test area 112a on the inner peripheral side of the optical disc 99 from a result of test recording, and the subsequent control over the laser power value is executed based on ROPC taking fluctuations in the recording linear velocity into consideration. Here, since test recording is carried out in the test area 112a by rotating the optical disc 99 at the same angular velocity as that in actual recording, the recording linear velocity in test recording becomes substantially equal to that at the time of recording on the innermost peripheral side of the program area 118 where actual recording is effected. That is, in this test recording, it can be said that it is possible to further accurately obtain the recording laser power value with which high-grade recording can be performed when recording at a position in the vicinity of the innermost periphery in the program area 118. Therefore, as with a DAO (Disc at Once) recording mode, when a recording start position in the optical disc 99 is a position on the innermost peripheral side of the program area 118, the initial value of the recording laser power determined by OPC such as that in the third embodiment can be considered as a value which enables high-grade recording.

As a recording mode with respect to the optical disc 99, however, there are modes called TAO (Track at Once), SAO (Session at Once) and packet write as well as the above-described DAO, and there is a case that data is added to the already recorded optical disc 99 in these recording modes. That is, a recording start position is not restricted to a position on the innermost peripheral side of the program area 118, and it can be a position in the vicinity of the central portion or a position on the outer peripheral side of the program area 118. When recording starts from such a position, the recording linear velocity of test recording based on OPC in the third embodiment greatly differs from the recording linear velocity at start of actual direction, and there may occur a disadvantage when the laser power initial value at start of recording is set based on OPC similar to the third embodiment.

Therefore, in this modification, the recording linear velocity of test recording in OPC for obtaining the initial value of the laser power is changed in accordance with a position on the optical disc 99 from which actual recording starts. More specifically, the control portion 16 first performs the laser power control in accordance with the procedure shown in FIG. 25. When start of recording is directed, the control portion 16 first acquires a position on the optical disc 99 from which actual recording should be started (step Sd1). Here, a recording start position when starting recording from a position in the middle of the optical disc 99 can be acquired by reading the recording content of PMA (Program Memory Area) in the optical disc 99.

When the recording start position is acquired in this manner, the control portion 16 obtains the recording linear velocity when driving the optical disc 99 at that recording start position to rotate at the angular velocity used in actual recording. Then, this recording linear velocity is set to a recording linear velocity used for performing test recording of OPC (step Sd2).

Thereafter, test recording is carried out at the recording linear velocity set as described above, and OPC for obtaining the initial value of the recording laser power from a result of test recording is conducted (step Sd3). That is, the control portion 16 obtains such an angular velocity as that recording is carried out with respect to the test area 112a at the set recording linear velocity, and controls each portion of the apparatus in such a manner that the optical disc 99 is driven to rotate at that angular velocity. Moreover, the recording laser power value with which high-grade recording is enabled at the set recording linear velocity is obtained from a result of test recording carried out at such a recording linear velocity. That is, test recording is performed at the same recording linear velocity as that at start of actual recording, and the recording laser power value with which excellent recording is enabled at this recording linear velocity is obtained from a result of test recording.

When the control portion 16 obtains the recording laser power value by OPC including test recording at the linear velocity according to the recording start position, it starts actual recording with respect to the optical disc 99 from the thus obtained recording start position (step Sd4). After setting the initial value of the laser power and starting recording as described above, the control portion 16 performs the laser power control by ROPC as similar to the third embodiment.

As mentioned above, the initial value of the laser power can be set to a preferable value by obtaining the initial value of the laser power when performing actual recording from a result of test recording carried out at the same linear velocity as that of the recording linear velocity at start of recording, thereby suppressing deterioration in the recording quality in the vicinity of the recording start position.

C-2-4: Modification 4

In addition, in the above-described third embodiment 3, although the initial value of the laser power is set to a preferable value by performing test recording at the same recording linear velocity as that at start of actual recording, the laser power control according to the procedure shown in FIG. 26 may be executed.

The control portion 16 first controls each portion of the apparatus for performing OPC (step Se1). As described above, test recording is carried out with respect to the test area 112a of the optical disc D in OPC as mentioned above, and an optimum laser power value is obtained based on a result of this test recording. Here, the control portion 16 controls the servo circuit 13 in such a manner that recording can be effected in test recording of OPC at a linear velocity Vmax higher than that of actual recording.

The control portion 16 drives the optical disc 99 to rotate in such a manner that recording is performed at the above-described linear velocity Vmax higher than that at start of actual recording, performs test recording with respect to the optical disc 99, and obtains such a laser power value as that the β value detected by the β detection circuit 24 coincides with a preset target β value from a reproduction signal in the test-recorded area. That is, by executing OPC, the control portion 16 obtains the optimum laser power value at the time of recording by driving the optical disc 99 to rotate in such a manner that recording can be effected at the linear velocity Vmax with respect to the PCA area on the inner peripheral side of the optical disc 99.

The control portion 16 performs test recording by driving the optical disc D to rotate in such a manner that recording can be effected with respect to the test area 112a at the linear velocity Vmax as described above. When the optimum power value is obtained from the reproduction signal, the control portion 16 then performs test recording by driving the optical disc 99 to rotate (linear velocity at this moment is assumed as V) at substantially the same angular velocity as that at start of actual recording, and obtains the optimum laser power value from a result of this test recording as similar to the above. That is, the control portion 16 executes OPC for the second time (step Se2), and obtains the optimum laser power value at the time of recording at the linear velocity V by OPC.

As mentioned above, upon completing the second OPC, as shown in FIG. 27, the control portion 16 obtains a power value Pr of a laser beam emitted from the optical pickup 10 at start of actual recording from an optimum laser power value Pm obtained from a result of test recording at the linear velocity Vmax, an optimum laser power Pn obtained from a result of test recording at the linear velocity V and a position R on the optical disc 99 at which actual recording starts. Giving description on the principle, the relationship between the recording linear velocity and the optimum laser power is first obtained by interpolating the optimum laser power values Pm and Pn at two angular velocities (linear interpolation in the illustrated example) (see FIG. 27). As described above, although recording positions in OPC for two times are substantially the same, angular velocities in the two times of recording are different from each other, and the both recording linear velocities differs from each other. Here, it is assumed that the recording linear velocity in test recording when the optimum laser power value Pm is obtained is Vmax, and the recording linear velocity in test recording when the optimum laser power value Pn is obtained is V.

When the relationship between the recording linear velocity and the power such as shown in FIG. 27 is acquired, the control portion 16 obtains the recording linear velocity (=Vr) when the optical disc 99 is driven to rotate at a predetermined angular velocity with respect to the position R on the optical disc 99 at which actual recording should be started. Then, the optimum laser power value Pr corresponding to this recording linear velocity Vr is obtained from this relationship between the recording linear velocity and power. It is to be noted that the recording start position when recording in the SAO or TAO mode can be obtained by reading PMA (Program Memory Area) in the optical disc 99.

The control portion 16 determines the power value Pr obtained by OPC for two times as mentioned above as an initial value, and starts actual recording (step Se3). The control portion 16 thereafter controls the laser power by ROPC taking fluctuations in velocity similar to those in the third embodiment into consideration (step Se4).

As mentioned above, the relationship between the recording linear velocity and the power is obtained by performing several times (twice in the above example) OPC including test recording carried out at different recording linear velocities. The laser power value suitable for the recording linear velocity at start of recording can be set as an initial value based on the thus obtained relationship between the recording linear velocity and the laser power, thereby suppressing deterioration in the recording quality in the vicinity of the recording start position.

C-2-5: Modification 5

Incidentally, although test recording may be performed with respect to the test area 112a at different recording linear velocities by driving the optical disc 99 to rotate at different angular velocities and the relationship between the recording linear velocity and the power may be obtained from a result of such test recording as described in connection with the modification 4, the relationship between the recording linear velocity and the power may be obtained by the following method.

That is, an angular velocity at which optical disc 99 is rotated is determined as fixed (for example, the same angular velocity as that in actual recording) every time each test recording which is performed for a plurality of times is conducted, and each test recording is carried out with respect to the test area 112a and the remaining area on the outer peripheral side of the program area 118. As shown in FIG. 28, when recording is carried out by driving the optical disc 99 to rotate at a given angular velocity, the relationship between the recording position on the optical disc 99 in the radial direction and the recording linear velocity is a proportionality relation such that the recording linear velocity increases as the position in the radial direction moves toward the outer peripheral side. Therefore, when test recording is conducted with respect to the two areas, i.e., the test area 112a and the remaining area on the outer peripheral side of the program area 118 while rotating the optical disc 99 at the same angular velocity, the both recording linear velocities are different from each other. In this manner, as similar to the modification 4, the relationship between the recording linear velocity and the power may be obtained by using a result of test recording which can be obtained by performing test recording with respect to the two areas, i.e., the test area 112a and the remaining area on the outer peripheral side at different recording linear velocities.

C-2-6: Modification 6

Additionally, in the modification 4 and the modification 5 mentioned above, the relationship between the recording linear velocity and the power, which is a so-called power function, is obtained by OPC, and an initial value of the laser power value is determined based on the power function. Although only the initial value of the laser power may be determined based on the power function obtained by OPC, the laser power may be controlled in accordance with the power function until a predetermined time elapses after start of actual recording (or a predetermined quantity of data is recorded), and the above-described ROPC taking fluctuations in velocity into consideration may be used for the laser power control after elapse of the predetermined time (or recording the predetermined quantity of data). An example of the procedure of such a laser power control method will now be described with reference to FIG. 29.

As shown in the drawing, the control portion 16 performs OPC including test recording carried out at different recording linear velocities for two times as similar to the method according to the modification 4 mentioned above (step Sf1 and step Sf2). Here, test recording for two times may be conducted with respect to the test area 112a by driving the optical disc 99 to rotate at different angular velocities as explained in connection with the modification 4, or it may be performed with respect to different areas, e.g., the test area 112a and the remaining area on the outer peripheral side at the same velocity as described in conjunction with the modification 5.

When OPC including test recording for two times is performed as mentioned above, the control portion 16 derives a power function (see FIG. 27) which is the relationship between the recording linear velocity and the power from a result of OPC as similar to the method according to the modification 4 (step Sf3). Then, the control portion 16 sets an initial value of the laser power based on the derived function, and starts control for executing actual recording (step Sf4). In this modification, the control portion 16 carries out the laser power control based on the derived power function even after start of actual recording.

Thereafter, the control portion 16 makes judgment upon whether a quantity of data recorded on the optical disc 99 has reached a preset quantity of data (for example, data for one minute (4500 frames)) (step Sf5). Here, if it is determined that a quantity of recorded data is yet to reach a predetermined quantity of data, the control portion 16 executes the laser power control based on the power function as it is. On the other hand, if it is determined that a quantity of recorded data has reached the predetermined quantity of data, the control portion 16 switches from the laser power control based on the power function to the laser power control by ROPC taking fluctuations in velocity into consideration which is similar to the third embodiment, and then executes the laser power control by ROPC until recording is completed (step Sf6).

By execution of the above-described laser power control by the control portion 16, the laser power control based on the power function is carried out until a predetermined quantity of data is recorded on the optical disc 99 after start of actual recording, and the laser power control by ROPC is effected after the predetermined quantity of data is recorded. In this manner, by executing switching of the laser power control, it is possible to switch to the laser power control based on ROPC after the power control at the early stage of actual recording enters the stable state. Therefore, the stable laser power control can be conducted, thereby suppressing deterioration or the like in recording quality.

C-2-7: Modification 7

Further, the above-described third embodiment and various kinds of modifications adopt ROPC as a laser power control method in actual recording. As mentioned above, in ROPC, the return light from the optical disc 99 is detected when performing recording by irradiating the optical disc 99 with a laser beam, and the intensity of the laser power emitted from the optical pickup 10 is controlled in such a manner a level of the return light (shoulder level) or a value uniquely specified by this level coincides with a previously stored target value, namely, the laser power control circuit 20 controls the current supplied to the laser diode of the optical pickup 10. In this manner, a response speed when controlling the laser power, i.e., the servo gain may be changed in accordance with a recording linear velocity.

More specifically, a plurality of laser power control circuits, e.g., two laser power control circuits having different servo gains are prepared in advance, and the control portion 16 selects any laser power control circuit to be used in accordance with a recording linear velocity in recording. Then, the selected laser power control circuit controls a value of the current to be supplied to the laser diode of the optical pickup 10 in accordance with a direction from the control portion 16. Here, it is good enough for the control circuit 16 to select the laser power control circuit having a larger servo gain if the recording linear velocity is larger than a predetermined value, and select the laser power control circuit having a smaller servo gain if the recording linear velocity is smaller than the predetermined value.

As described above, by switching a response speed (servo gain) of the laser power control in accordance with the recording linear velocity, the following advantage can be obtained. When adopting a recording mode in which the recording linear velocity varies in recording as with CAV recording or ZCLV recording carried out in the third embodiment, it is required to control the laser power in such a manner that the return light coincides with a target value corresponding to a recording linear velocity at that moment in a shorter time as the recording linear velocity increases. On the other hand, If the servo gain is increased when the recording linear velocity is small, a recording error may be generated due to a sudden fluctuation of the laser power.

Accordingly, the response speed when controlling the laser power is increased if the recording linear velocity is high, and the same is reduced if the recording linear velocity is low as in this modification. As a result, it is possible to obtain the advantage of performing high-grade recording with respect to all areas including a low-velocity recording area (area on the inner peripheral side) to a high-velocity recording area (area on the outer peripheral side) of the optical disc 99.

C-2-8: Modification 8

Further, it is also possible to apply the laser power control method according to the third embodiment of the present invention to the optical disc recording apparatus which performs a so-called partial CAV recording. In partial CAV recording, CAV recording which is a recording mode using a fixed rotational angular velocity of the optical disc is executed until a given set recording linear velocity V is reached, and CLV recording at the set recording linear velocity V is performed after the recording linear velocity reaches the set recording linear velocity V by movement of a recording position toward the outer peripheral side (see FIG. 16).

In case of performing such partial CAV recording, although ROPC taking such fluctuations in velocity as described in the third embodiment or each modification may be carried out, the following ROPC may be executed.

As shown in FIG. 30, a table which includes a plurality of types of maximum recording linear velocities and shoulder level values corresponding to respective maximum recording linear velocities in association with each other (correspondence relationship) is stored in the memory of the control portion 16 in advance. As illustrated in the drawing, this table stores therein shoulder level values (Lm12, Lm16 and Lm20) in association with maximum velocities in partial CAV recording (corresponding to the set recording linear velocities V) which can be executed in the optical disc recording apparatus, e.g., the twelvefold velocity, the sixteenfold velocity and the twentyfold velocity. Here, the shoulder level values stored in this table are values obtained by an experiment or the like, and these are shoulder level values at which excellent recording can be effected when recording is carried out at the corresponding maximum recording linear velocities.

Moreover, when a user directs to perform recording at the twelvefold recording linear velocity at the innermost periphery and the sixteenfold recording linear velocity at the outermost periphery (corresponding to the set recording linear velocities V), the control portion 16 controls the spindle motor 11 through the servo circuit 13 so that recording can be executed at each linear velocity (partial CAV mode at twelvefold to sixteenfold velocities) corresponding to the detail of the direction. In addition, in case of recording based on this direction, the table stored in the memory is read, and ROPC using the shoulder level value corresponding to the set recording linear velocity (=sixteenth velocity) as a target value is performed by making reference to this table. In this manner, by performing ROPC corresponding to the maximum recording linear velocities, it is possible to reduce generation of recording errors in the high-velocity recording area requiring the highly accurate laser power control.

As described above, according to the present invention, even if the recording linear velocity greatly differs depending on the inner or outer side of the disc, e.g., when performing CAV recording at a high velocity, further appropriate data recording can be executed in all areas on the disc.

What is claimed is:

1. A method of controlling a power of a laser beam irradiated onto a track of an optical disc for recording of data at a given linear velocity, the method comprising:
   a test recording step of performing test recording into a predetermined area of the optical disc before actual recording of data;
   a reproduction step of acquiring a reproduction signal that represents a result of the test recording from the predetermined area of the optical disc where the test recording has been carried out;
   a parameter characteristic acquisition step of acquiring velocity-vs.-parameter characteristic information that is indicative of the relationship between plural levels of the linear velocity and target values of a parameter that represents a target quality of the recording in correspondence with the respective levels of the linear velocity;
   a derivation step of deriving velocity-vs.-power characteristic information that is indicative of the relationship between the levels of the linear velocity and optimal values of the power based on both of the reproduction signal that represents the result of the test recording and the velocity-vs.-parameter characteristic information; and
   a control step of controlling the power of the laser beam irradiated onto the optical disc in accordance with the velocity-vs.-power characteristic information at the time of the actual recording.

2. The method according to claim 1, wherein the parameter characteristic acquisition step is carried out to derive the velocity-vs.-parameter characteristic information from the reproduction signal acquired by the reproduction step.

3. The method according to claim 1, wherein the parameter characteristic acquisition step acquires the velocity-vs.-parameter characteristic information which has been stored in advance.

4. The method according to claim 1, wherein the test recording step is performed at each level of the linear velocity while changing the power of the laser beam, and the derivation step determines an optimal value of the power at which the target value of the parameter is obtained for each level of the linear velocity according to both of the velocity-vs.-parameter characteristic information and the reproduction signal that represents the result of the test recording to thereby obtain the relationship between each level of the linear velocity and the corresponding optimal value of the power.

5. The method according to claim 1, wherein the control step comprises detecting a value of the power of the laser beam irradiated onto the optical disc, controlling the power of the laser beam according to the velocity-vs.-power characteristic information in such a manner that the detected value of the power follows the velocity-vs.-power characteristic at a given response speed, and regulating the response speed in accordance with the level of the linear velocity during the actual recording.

6. A method of controlling a power of a laser beam irradiated onto a track of an optical disc for recording of data under either of CAV mode and CLV mode, the CAV mode being selected for rotating the optical disc at a fixed angular velocity in case of the recording at a linear velocity lower than a given linear velocity and the CLV mode being selected for rotating the optical disc at a varying angular velocity in such a manner that the recording is executed at the given linear velocity after the linear velocity reaches the given linear velocity in the CAV mode, the method comprising:
- a test recording step of performing test recording into a predetermined area of the optical disc before actual recording of data;
- a reproduction step of acquiring a reproduction signal that represents a result of the test recording from the predetermined area of the optical disc where the test recording has been carried out;
- a parameter acquisition step of acquiring a target value of a parameter that represents a quality of the recording at the given linear velocity;
- a derivation step of deriving velocity-vs.-power characteristic information that is indicative of the relationship between the given linear velocity and an optimal value of the power of the laser beam based on both of the reproduction signal that represents the result of the test recording and the target value of the parameter that represents the quality of the recording at the given linear velocity; and
- a control step of controlling the power of the laser beam irradiated onto the optical disc in accordance with the velocity-vs.-power characteristic information at the time of the actual recording.

7. The method according to claim 6, wherein the control step comprises detecting a value of the power of the laser beam irradiated onto the optical disc, controlling the power of the laser beam according to the velocity-vs.-power characteristic information in such a manner that the detected value of the power follows the velocity-vs.-power characteristic at a given response speed, and regulating the response speed in accordance with the designated given linear velocity.

8. A method of controlling a power of a laser beam irradiated onto a track of an optical disc for recording of data along the track at a given linear velocity, the method comprising:
- a return light detection step of detecting a value associated with a return light reflected back from the optical disc upon irradiation of the laser beam during the recording;
- a linear velocity acquisition step of acquiring a value of the linear velocity during the recording of data onto the optical disc; and
- a control step of controlling the power of the laser beam to be irradiated onto the optical disc based on both of the detected value associated with the return light and the acquired value of the linear velocity.

9. The method according to claim 8, wherein the control step controls the power of the laser beam to be irradiated onto the optical disc in such a manner that the detected value associated with the return light and the acquired value of the linear velocity satisfy a correlation therebetween which is provisionally prepared.

10. The method according to claim 9, wherein the correlation between the value of the linear velocity arid the value associated with the return light is derived based on a result of recording carried out at different values of the linear velocity in advance.

11. The method according to claim 8, wherein the control step controls the power of the laser beam to be irradiated onto the optical disc in such a manner that the detected value associated with the return light and the acquired value of the linear velocity satisfy a correlation among the value of the linear velocity, the value associated with the return light and the value of the power of the laser beam, which are prepared in advance.

12. The method according to claim 8, further comprising a test recording step of performing test recording onto the optical disc before actual recording, and an initial value determination step of determining an initial value of the power of the laser beam from a result of the test recording, wherein the control step sets the power of the laser beam to the initial value when starting the actual recording and controls the power of the laser beam to be irradiated onto the optical disc based on the detected value associated with the return light and the acquired value of the linear velocity after the start of the actual recording.

13. The method according to claim 12, further comprising a start velocity acquisition step of acquiring a start value of the linear velocity, which is used when starting the actual recording, wherein the test recording step performs the test recording at the start value of the linear velocity acquired by the start velocity acquisition step.

14. A method of controlling a power of a laser beam irradiated onto a track of an optical disc for recording of data under either of CAV mode and CLV mode, the CAV mode being selected for rotating the optical disc at a fixed angular velocity in case of the recording at a linear velocity lower than a given linear velocity and the CLV mode being selected for rotating the optical disc at a varying angular velocity in such a manner that the recording is executed at the given linear velocity after the linear velocity reaches the given linear velocity during the CAV mode, the method comprising:
- a detection step of detecting a value associated with a return light reflected back from the optical disc upon irradiation of the laser beam during the recording;
- an acquisition step of acquiring a correspondence relationship between different values of the linear velocity and respective target values associated with the return light determined for the different values of the linear velocity;
- a target value acquisition step of acquiring a target value associated with the return light corresponding to the given linear velocity with reference to the acquired correspondence relationship; and
- a control step of controlling the power of the laser beam irradiated onto the optical disc in such a manner that the value associated with the return light detected by the detection step coincides with the acquired target value associated with the return light.

15. An apparatus for irradiating a laser beam having a controllable power onto a track of an optical disc to effect recording of data along the track at a given linear velocity, the apparatus comprising:
- a test recording section that is provided for performing test recording into a predetermined area of the optical disc before actual recording of data;
- a reproduction section that is provided for acquiring a reproduction signal that represents a result of the test recording from the predetermined area of the optical disc where the test recording has been carried out;
- a parameter characteristic acquisition section that is provided for acquiring velocity-vs.-parameter characteristic information that is indicative of the relationship between plural levels of the linear velocity and target values of a parameter that represents a quality of the recording in correspondence with the respective levels of the linear velocity;
- a derivation section that is provided for deriving velocity-vs.-power characteristic information that is indicative of the relationship between the levels of the linear velocity and optimal values of the power of the laser beam based on both of the reproduction signal that represents the result of the test recording and the velocity-vs.-parameter characteristic information; and a control section that is provided for controlling the power of the laser beam irradiated onto the optical disc in accordance with the velocity-vs.-power characteristic information at the time of the actual recording.

16. An apparatus for irradiating a laser beam having a controllable power onto a track of an optical disc to effect recording of data along the track under either of CAV mode and CLV mode, the CAV mode being selected for rotating the optical disc at a fixed angular velocity in case of the recording at a linear velocity lower than a given linear velocity and the CLV mode being selected for rotating the optical disc at a varying angular velocity in such a manner that the recording is executed at the given linear velocity after the linear velocity reaches the given linear velocity during the CAV mode, the apparatus comprising:

a test recording section that is provided for performing test recording into a predetermined area of the optical disc before actual recording of data;

a reproduction section that is provided for acquiring a reproduction signal that represents a result of the test recording from the predetermined area of the optical disc where the test recording has been carried out;

a parameter acquisition section that is provided for acquiring a target value of a parameter that represents a quality of the recording at the given linear velocity;

a derivation section that is provided for deriving velocity-vs.-power characteristic information that is indicative of the relationship between the designated given linear velocity and an optimal value of the power of the laser beam based on both of the reproduction signal that represents the result of the test recording and the target value of the parameter that represents the quality of the recording at the given linear velocity; and a control section that is provided for controlling the power of the laser beam irradiated onto the optical disc in accordance with the velocity-vs.-power characteristic information at the time of the actual recording.

17. An apparatus for irradiating a laser beam having a controllable power onto a track of an optical disc to effect recording of data along the track at a given linear velocity, the apparatus comprising:

a return light detection section that is provided for detecting a value associated with a return light reflected back from the optical disc upon irradiation of the laser beam during the recording;

a linear velocity acquisition section that is provided for acquiring a value of the linear velocity during the recording of data on the optical disc; and a control section that is provided for controlling the power of the laser beam to be irradiated onto the optical disc based on both of the detected value associated with the return light and the acquired value of the linear velocity.

18. An apparatus for irradiating a laser beam having a controllable power onto a track of an optical disc to effect recording of data along the track under either of CAV mode and CLV mode, the CAV mode being selected for rotating the optical disc at a fixed angular velocity in case of the recording at a linear velocity lower than a given linear velocity and the CLV mode being selected for rotating the optical disc at a varying angular velocity in such a manner that the recording is executed at the given linear velocity after the linear velocity reaches the given linear velocity during the CAV mode, the apparatus comprising:

a detection section that is provided for detecting a value associated with a return light reflected back from the optical disc upon irradiation of the laser beam during the recording;

an acquisition section that is provided for acquiring a correspondence relationship between different values of the linear velocity and respective target values associated with the return light determined for the different values of the linear velocity;

a target value acquisition section that is provided for acquiring a target value associated with the return light corresponding to the given linear velocity with reference to the acquired correspondence relationship; and a control section that is provided for controlling the power of the laser beam irradiated on the optical disc in such a manner that the value associated with the return light detected by the detection step coincides with the acquired target value associated with the return light.

19. A computer-readable medium encoded with instructions that, when executed, cause a computer to perform a process of controlling a power of a laser beam irradiated onto a track of an optical disc for recording of data at a given linear velocity, said process comprising:

a test recording step of performing test recording into a predetermined area of the optical disc before actual recording of data;

a reproduction step of acquiring a reproduction signal that represents a result of the test recording from the predetermined area of the optical disc where the test recording has been carried out;

a parameter characteristic acquisition step of acquiring velocity-vs.-parameter characteristic information that is indicative of the relationship between plural levels of the linear velocity and target values of a parameter that represents a target quality of the recording in correspondence with the respective levels of the linear velocity;

a derivation step of deriving velocity-vs.-power characteristic information that is indicative of the relationship between the levels of the linear velocity and optimal values of the power based on both of the reproduction signal that represents the result of the test recording and the velocity-vs.-parameter characteristic information; and a control step of controlling the power of the laser beam irradiated onto the optical disc in accordance with the velocity-vs.-power characteristic information at the time of the actual recording.

20. A computer-readable medium encoded with instructions that, when executed, cause a computer to perform a process of controlling a power of a laser beam irradiated onto a track of an optical disc for recording of data under either of CAV mode and CLV mode, the CAV mode being selected for rotating the optical disc at a fixed angular velocity in case of the recording at a linear velocity lower than a given linear velocity and the CLV mode being selected for rotating the optical disc at a varying angular velocity in such a manner that the recording is executed at the given linear velocity after the linear velocity reaches the given linear velocity in the CAV mode, said process comprising:

a test recording step of performing test recording into a predetermined area of the optical disc before actual recording of data;

a reproduction step of acquiring a reproduction signal that represents a result of the test recording from the predetermined area of the optical disc where the test recording has been carried out;

a parameter acquisition step of acquiring a target value of a parameter that represents a quality of the recording at the given linear velocity;

a derivation step of deriving velocity-vs.-power characteristic information that is indicative of the relationship between the given linear velocity and an optimal value of the power of the laser beam based on both of the reproduction signal that represents the result of the test recording and the target value of the parameter that represents the quality of the recording at the given linear velocity; and a control step of controlling the power of the laser beam irradiated onto the optical disc in accordance with the velocity-vs.-power characteristic information at the time of the actual recording.

21. A computer-readable medium encoded with instructions that, when executed, cause a computer to perform a process of controlling a power of a laser beam irradiated onto a track of an optical disc for recording of data along the track at a given linear velocity, said process comprising:

a return light detection step of detecting a value associated with a return light reflected back from the optical disc upon irradiation of the laser beam during the recording;

a linear velocity acquisition step of acquiring a value of the linear velocity during the recording of data onto the optical disc; and a control step of controlling the power of the laser beam to be irradiated onto the optical disc based on both of the detected value associated with the return light and the acquired value of the linear velocity.

22. A computer-readable medium encoded with instructions that, when executed, cause a computer to perform a process of controlling a power of a laser beam irradiated onto a track of an optical disc for recording of data under either of CAV mode and CLV mode, the CAV mode being selected for rotating the optical disc at a fixed angular velocity in case of the recording at a linear velocity lower than a given linear velocity and the CLV mode being selected for rotating the optical disc at a varying angular velocity in such a manner that the recording is executed at the given linear velocity after the linear velocity reaches the given linear velocity during the CAV mode, said process comprising:

a detection step of detecting a value associated with a return light reflected back from the optical disc upon irradiation of the laser beam during the recording;

an acquisition step of acquiring a correspondence relationship between different values of the linear velocity and respective target values associated with the return light determined for the different values of the linear velocity;

a target value acquisition step of acquiring a target value associated with the return light corresponding to the seven linear velocity with reference to the acquired correspondence relationship; and a control step of controlling the power of the laser beam irradiated onto the optical disc in such a manner that the value associated with the return light detected by the detection step coincides with the acquired target value associated with the return light.

* * * * *